(12) United States Patent
Zou et al.

(10) Patent No.: US 7,994,082 B2
(45) Date of Patent: *Aug. 9, 2011

(54) PREFORMS FOR PRECISION PRESS MOLDING, OPTICAL ELEMENTS, AND METHODS OF MANUFACTURING THE SAME

(75) Inventors: Xuelu Zou, Akishima (JP); Yoshiko Kasuga, Koganei (JP); Yasuhiro Fujiwara, Akishima (JP)

(73) Assignee: Hoya Corporation, Tokyo (JP)

( * ) Notice: Subject to any disclaimer, the term of this patent is extended or adjusted under 35 U.S.C. 154(b) by 1129 days.

This patent is subject to a terminal disclaimer.

(21) Appl. No.: 10/878,618

(22) Filed: Jun. 29, 2004

(65) Prior Publication Data

US 2005/0032621 A1    Feb. 10, 2005

(30) Foreign Application Priority Data

Jun. 30, 2003  (JP) ................................. 2003-188455
Aug. 29, 2003  (JP) ................................. 2003-306126

(51) Int. Cl.
*C03C 3/21*     (2006.01)
*C03C 3/16*     (2006.01)
*C03C 3/19*     (2006.01)
*C03B 11/00*    (2006.01)
*C03B 17/00*    (2006.01)

(52) U.S. Cl. .................. 501/46; 501/45; 501/47; 65/63; 65/102; 65/127

(58) Field of Classification Search ................ 501/45, 501/46, 47, 48; 65/63, 102, 127
See application file for complete search history.

(56) References Cited

U.S. PATENT DOCUMENTS

| 4,980,318 | A | * | 12/1990 | Araujo | .............................. 501/13 |
| 5,153,151 | A | * | 10/1992 | Aitken | .............................. 501/45 |
| 5,668,066 | A | | 9/1997 | Oguma et al. | |
| 6,225,244 | B1 | | 5/2001 | Oguma | |
| 6,333,282 | B1 | | 12/2001 | Nakahata et al. | |
| 6,743,743 | B2 | | 6/2004 | Sato | |
| 6,786,064 | B2 | | 9/2004 | Hayashi et al. | |
| 6,875,714 | B2 | | 4/2005 | Izuki | |
| 6,995,101 | B2 | | 2/2006 | Zou et al. | |
| 7,060,640 | B2 | | 6/2006 | Ogino et al. | |
| 7,157,391 | B2 | | 1/2007 | Kasuga et al. | |
| 7,309,670 | B2 | | 12/2007 | Fujiwara et al. | |
| 2002/0073735 | A1 | | 6/2002 | Hayashi et al. | |
| 2003/0220182 | A1 | * | 11/2003 | Izuki | ............................... 501/46 |
| 2004/0018933 | A1 | * | 1/2004 | Ogino et al. | .................... 501/45 |
| 2004/0259714 | A1 | | 12/2004 | Fujiwara et al. | |
| 2005/0032621 | A1 | | 2/2005 | Zou et al. | |
| 2005/0164862 | A1 | | 7/2005 | Shiraishi | |
| 2006/0058171 | A1 | | 3/2006 | Izuki | |
| 2006/0081010 | A1 | | 4/2006 | Zou et al. | |
| 2007/0027016 | A1 | | 2/2007 | Ogino et al. | |

FOREIGN PATENT DOCUMENTS

| EP | 1 078 894 | | 2/2001 |
| EP | 1468974 | A2 | 10/2004 |
| JP | 2001-058845 | A | 3/2001 |
| JP | 2002-173336 | A | 6/2002 |
| JP | 2002-201041 | A | 7/2002 |
| JP | 2003-165743 | A | 6/2003 |
| JP | 2003160355 | A * | 6/2003 |
| JP | 2003238197 | A * | 8/2003 |
| JP | 2003-300751 | A | 10/2003 |
| JP | 2003-335549 | A | 11/2003 |
| JP | 2004123448 | A * | 4/2004 |
| JP | 2005-154248 | A | 6/2005 |

OTHER PUBLICATIONS

Machine Translation of JP 2004-123448, Apr. 22, 2004.*
Machine Translation of JP 2003-238197, Aug. 27, 2003.*
Patent Abstracts of Japan, JP 08-104537, Apr. 23, 1996.
Patent Abstracts of Japan, JP 2003-160355, Jun. 3, 2003.
Patent Abstracts of Japan, JP 2002-128540, May 9, 2002.
Japanese Office Action dated Oct. 28, 2008.
Japanese Office Action corresponding to Japanese Patent Application No. 2004-189149, dated Jan. 29, 2010.

* cited by examiner

Primary Examiner — Karl E Group
Assistant Examiner — Elizabeth A Bolden
(74) Attorney, Agent, or Firm — Sughrue Mion, PLLC

(57) ABSTRACT

Preforms for precision press molding made of optical glass, optical elements, and methods of manufacturing the same are provided. The preforms are suited to precision press molding having a broad range of dispersion characteristics, a low glass transition temperature, a low sag point, and good resistance to devitrification while containing no PbO. The optical element is obtained by precision press molding the preform. One example of the preform has a refractive index (nd) of greater than or equal to 1.7 and an Abbé number (vd) of less than or equal to 32. The other example of the preform has an Abbé number (vd) exceeding 32.

18 Claims, 3 Drawing Sheets

PREFORMS FOR PRECISION PRESS MOLDING, OPTICAL ELEMENTS, AND METHODS OF MANUFACTURING THE SAME

TECHNICAL FIELD

The present invention relates to preforms for precision press molding made of optical glass, optical elements, and methods of manufacturing the same.

BACKGROUND ART

Since precision press-molded aspherical lenses and the like that are made with optical glass having broad dispersion characteristics (for example, an Abbé number, vd, of 17 to 72) are extremely useful in optical design, the demand for the optical glass used in such precision press molding is increasing. However, large quantities of lead oxide have been incorporated into the optical glass compositions of many of the glasses and the pressing temperature has been reduced to increase the service life of the pressing mold employed in precision press molding. For example, Japanese Unexamined Patent Publication (KOKAI) Heisei No. 1-308843 discloses an optical glass for precision pressing comprised of (denoted as weight percentages): $SiO_2$: 15 to 50 percent, PbO: 30 to 58 percent, $Li_2O$: 0.1 to 7 percent, $Na_2O$: 0 to 15 percent, $K_2O$: 0 to 15 percent where $Li_2O+Na_2O+K_2O$: 3 to 25 percent; $La_2O_3$: 0 to 15 percent, MgO: 0 to 10 percent, $TiO_2$: 0 to 10 percent, where $La_2O_3+MgO+TiO_2$: 0.1 to 20 percent, $ZrO_2$: 0 to 5 percent, $Al_2O_3$: 0 to 10 percent, where $ZrO_2+Al_2O_3$: 0.1 to 10 percent; ZnO: 0 to 20 percent, $B_2O_3$: 0 to 15 percent, $Y_2O_3$: 0 to 5 percent, $Gd_2O_3$: 0 to 5 percent, CaO: 0 to 10 percent, SrO: 0 to 15 percent, BaO: 0 to 9 percent; $Nb_2O_5$: 0 to 15 percent, $Ta_2O_5$: 0 to 5 percent, $WO_3$: 0 to 5 percent, $P_2O_5$: 0 to 5 percent, $As_2O_3$: 0 to 1 percent, $Sb_2O_3$: 0 to 5 percent.

However, precision press molding is normally conducted in a nonreactive or weakly reducing atmosphere to prevent oxidation of the pressing mold. When precision press molding the above-described glass containing a large amount of lead oxide among the glass components, lead oxide at the surface of the glass is reduced, precipitating out as metallic lead on the surface of the lens. This then adheres to the mold material used to mold precision press-molded lenses, compromising the precision of the transfer surface of lenses that are precision press molded and requiring maintenance to remove the metallic lead adhering to the mold, which is not suited to mass production. Further, the melting of the glasses containing large quantities of lead oxide disclosed in the above-cited patent publication presents major problems in terms of environmental pollution. Thus, the glass disclosed in above-cited patent publication is unsuited to precision press molding.

The present invention, devised to solve the above-stated problems, has for its object to provide preforms for precision press molding comprised of optical glass imparting broad dispersion characteristics, permitting a low pressing temperature suited to precision press molding, and affording high stability; a method of manufacturing such preforms; optical elements obtained by precision press molding this preform; and a method of manufacturing such optical elements.

SUMMARY OF THE INVENTION

The present invention provides:

(1) a preform for precision press molding, characterized by being comprised of an optical glass the components of which are:

| | |
|---|---|
| $P_2O_5$: | 15 to 70 molar percent, |
| $Nb_2O_5$: | 1 to 30 molar percent |
| $TiO_2$: | 0 to 20 molar percent (excluding 0 molar percent), |
| $Bi_2O_3$: | 6 to 30 molar percent (excluding 6 molar percent and exceeding 4 weight percent), |
| $B_2O_3$: | 0 to 30 molar percent, |
| $WO_3$: | 1 to 20 molar percent, |
| BaO: | 0 to 15 molar percent, |
| $Li_2O$: | 3 to 15 weight percent (excluding 3 weight percent), |
| $SiO_2$: | 0 to 5 weight percent (excluding 5 weight percent), |
| ZnO: | 0 to 10 weight percent (excluding 10 weight percent), | which has a refractive index (nd) of greater than or equal to 1.7 and an Abbé number (vd) of less than or equal to 32;

(2) a preform for precision press molding, characterized by being comprised of an optical glass the components of which are:

| | |
|---|---|
| $P_2O_5$: | 15 to 70 molar percent, |
| $Nb_2O_5$: | 1 to 30 molar percent |
| $TiO_2$: | 0 to 20 molar percent (excluding 0 molar percent), |
| $Bi_2O_3$: | 6 to 30 molar percent (excluding 6 molar percent), |
| $B_2O_3$: | 0 to 30 molar percent (excluding 0 molar percent), |
| $WO_3$: | 1 to 20 molar percent, |
| BaO: | 0 to 15 molar percent, |
| $Li_2O$: | 3 to 15 weight percent (excluding 3 weight percent), |
| $SiO_2$: | 0 to 5 weight percent (excluding 5 weight percent), |
| ZnO: | 0 to 10 weight percent (excluding 10 weight percent), | which has a refractive index (nd) of greater than or equal to 1.7 and an Abbé number (vd) of less than or equal to 32;

(3) a preform for precision press molding, characterized by being comprised of an optical glass the components of which are:

| | |
|---|---|
| $P_2O_5$: | 15 to 70 molar percent, |
| $Nb_2O_5$: | 1 to 30 molar percent |
| $TiO_2$: | 0 to 20 molar percent (excluding 0 molar percent), |
| $Bi_2O_3$: | 6 to 30 molar percent (excluding 6 molar percent), |
| $B_2O_3$: | 0 to 30 molar percent, |
| $WO_3$: | 1 to 15 molar percent (less than 15 weight percent), |
| BaO: | 0 to 15 molar percent, |
| $Li_2O$: | 3 to 15 weight percent (excluding 3 weight percent), |
| $SiO_2$: | 0 to 5 weight percent (excluding 5 weight percent), |
| ZnO: | 0 to 10 weight percent (excluding 10 weight percent), | which has a refractive index (nd) of greater than or equal to 1.7 and an Abbé number (vd) of less than or equal to 32;

(4) a preform for precision press molding, characterized by being comprised of an optical glass the components of which are:

| | |
|---|---|
| $P_2O_5$: | 15 to 70 molar percent, |
| $Nb_2O_5$: | 1 to 30 molar percent |
| $TiO_2$: | 0 to 20 molar percent (excluding 0 molar percent), |
| $Bi_2O_3$: | 6 to 30 molar percent (excluding 6 molar percent and exceeding 4 weight percent), |
| $B_2O_3$: | 0 to 30 molar percent, |

-continued

| | |
|---|---|
| $WO_3$: | 1 to 20 molar percent, |
| BaO: | 0 to 15 molar percent, |
| $Li_2O$: | 3 to 15 weight percent (excluding 3 weight percent), |
| $SiO_2$: | 0 to 5 weight percent (excluding 5 weight percent), | where the $Li_2O$, $Na_2O$, and $K_2O$ content is 0 to 15 percent (excluding 15 weight percent), which has a refractive index (nd) of greater than or equal to 1.7 and an Abbé number (vd) of less than or equal to 32;

(5) a preform for precision press molding, characterized by being comprised of an optical glass the components of which are:

| | |
|---|---|
| $P_2O_5$: | 15 to 70 molar percent, |
| $Nb_2O_5$: | 1 to 30 molar percent |
| $TiO_2$: | 0 to 20 molar percent (excluding 0 molar percent), |
| $Bi_2O_3$: | 6 to 30 molar percent (excluding 6 molar percent), |
| $B_2O_3$: | 0 to 30 molar percent (excluding 0 molar percent), |
| $WO_3$: | 1 to 20 molar percent, |
| BaO: | 0 to 15 molar percent, |
| $Li_2O$: | 3 to 15 weight percent (excluding 3 weight percent), |
| $SiO_2$: | 0 to 5 weight percent (excluding 5 weight percent), | where the $Li_2O$, $Na_2O$, and $K_2O$ content is 0 to 15 percent (excluding 15 weight percent), which has a refractive index (nd) of greater than or equal to 1.7 and an Abbé number (vd) of less than or equal to 32;

(6) a preform for precision press molding, characterized by being comprised of an optical glass the components of which are:

| | |
|---|---|
| $P_2O_5$: | 15 to 70 molar percent, |
| $Nb_2O_5$: | 1 to 30 molar percent |
| $TiO_2$: | 0 to 20 molar percent (excluding 0 molar percent), |
| $Bi_2O_3$: | 6 to 30 molar percent (excluding 6 molar percent), |
| $B_2O_3$: | 0 to 30 molar percent, |
| $WO_3$: | 0 to 15 molar percent (less than 15 weight percent), |
| BaO: | 0 to 15 molar percent, |
| $Li_2O$: | 3 to 15 weight percent (excluding 3 weight percent), |
| $SiO_2$: | 0 to 5 weight percent (excluding 5 weight percent), | where the $Li_2O$, $Na_2O$, and $K_2O$ content is 0 to 15 percent (excluding 15 weight percent), which has a refractive index (nd) of greater than or equal to 1.7 and an Abbé number (vd) of less than or equal to 32;

(7) a preform for precision press molding, characterized by being comprised of an optical glass the components of which are:

| | |
|---|---|
| $P_2O_5$: | 15 to 70 molar percent, |
| $Nb_2O_5$: | 1 to 30 molar percent |
| $TiO_2$: | 0 to 20 molar percent (excluding 0 molar percent), |
| $Bi_2O_3$: | 0 to 30 molar percent (excluding 0 molar percent and exceeding 4 weight percent), |
| $B_2O_3$: | 0 to 30 molar percent, |
| $WO_3$: | 1 to 20 molar percent, |
| BaO: | 0 to 15 molar percent, |
| $Li_2O$: | 3 to 15 weight percent (excluding 3 weight percent), |
| $SiO_2$: | 0 to 5 weight percent (excluding 5 weight percent), |
| ZnO: | 0 to 10 weight percent (excluding 10 weight percent), | where the weight ratio of ($TiO_2$ content/$Bi_2O_3$ content) is less than 0.5, which has a refractive index (nd) of greater than or equal to 1.7 and an Abbé number (vd) of less than or equal to 32;

(8) a preform for precision press molding, characterized by being comprised of an optical glass the components of which are:

| | |
|---|---|
| $P_2O_5$: | 15 to 70 molar percent, |
| $Nb_2O_5$: | 1 to 30 molar percent |
| $TiO_2$: | 0 to 20 molar percent (excluding 0 molar percent), |
| $Bi_2O_3$: | 0 to 30 molar percent (excluding 0 molar percent), |
| $B_2O_3$: | 0 to 30 molar percent (excluding 0 molar percent), |
| $WO_3$: | 1 to 20 molar percent, |
| BaO: | 0 to 15 molar percent, |
| $Li_2O$: | 3 to 15 weight percent (excluding 3 weight percent), |
| $SiO_2$: | 0 to 5 weight percent (excluding 5 weight percent), |
| ZnO: | 0 to 10 weight percent (excluding 10 weight percent), | where the weight ratio of ($TiO_2$ content/$Bi_2O_3$ content) is less than 0.5, which has a refractive index (nd) of greater than or equal to 1.7 and an Abbé number (vd) of less than or equal to 32;

(9) a preform for precision press molding, characterized by being comprised of an optical glass the components of which are:

| | |
|---|---|
| $P_2O_5$: | 15 to 70 molar percent, |
| $Nb_2O_5$: | 1 to 30 molar percent |
| $TiO_2$: | 0 to 20 molar percent (excluding 0 molar percent), |
| $Bi_2O_3$: | 0 to 30 molar percent (excluding 0 molar percent), |
| $B_2O_3$: | 0 to 30 molar percent, |
| $WO_3$: | 0 to 15 molar percent (less than 15 molar percent), |
| BaO: | 0 to 15 molar percent, |
| $Li_2O$: | 3 to 15 weight percent (excluding 3 weight percent), |
| $SiO_2$: | 0 to 5 weight percent (excluding 5 weight percent), |
| ZnO: | 0 to 10 weight percent (excluding 10 weight percent), | where the weight ratio of ($TiO_2$ content/$Bi_2O_3$ content) is less than 0.5, which has a refractive index (nd) of greater than or equal to 1.7 and an Abbé number (vd) of less than or equal to 32;

(10) a preform for precision press molding, characterized by being comprised of an optical glass the components of which are:

| | |
|---|---|
| $P_2O_5$: | 15 to 70 molar percent, |
| $Nb_2O_5$: | 1 to 30 molar percent |
| $TiO_2$: | 0 to 20 molar percent (excluding 0 molar percent), |
| $Bi_2O_3$: | greater than 4 weight percent and less than or equal to 30 molar percent, |
| $B_2O_3$: | 0 to 30 molar percent, |
| $WO_3$: | 1 to 20 molar percent, |
| BaO: | 0 to 15 molar percent, |
| $Li_2O$: | 3 to 15 weight percent (excluding 3 weight percent), |
| $SiO_2$: | 0 to 5 weight percent (excluding 5 weight percent), | where the $Li_2O$, $Na_2O$, and $K_2O$ content is 0 to 15 percent (excluding 15 weight percent) and the weight ratio of ($TiO_2$ content/$BiO_2$ content) is less than 0.5, which has a refractive index (nd) of greater than or equal to 1.7 and an Abbé number (vd) of less than or equal to 32;

(11) a preform for precision press molding, characterized by being comprised of an optical glass the components of which are:

| | |
|---|---|
| $P_2O_5$: | 15 to 70 molar percent, |
| $Nb_2O_5$: | 1 to 30 molar percent |

-continued

| | |
|---|---|
| $TiO_2$: | 0 to 20 molar percent (excluding 0 molar percent), |
| $Bi_2O_3$: | 0 to 30 molar percent (excluding 0 molar percent), |
| $B_2O_3$: | 0 to 30 molar percent (excluding 0 molar percent), |
| $WO_3$: | 1 to 20 molar percent, |
| BaO: | 0 to 15 molar percent, |
| $Li_2O$: | 3 to 15 weight percent (excluding 3 weight percent), |
| $SiO_2$: | 0 to 5 weight percent (excluding 5 weight percent), | where the $Li_2O$, $Na_2O$, and $K_2O$ content is 0 to 15 percent (excluding 15 weight percent) and the weight ratio of ($TiO_2$ content/$BiO_2$ content) is less than 0.5, which has a refractive index (nd) of greater than or equal to 1.7 and an Abbé number (vd) of less than or equal to 32;

(12) a preform for precision press molding, characterized by being comprised of an optical glass the components of which are:

| | |
|---|---|
| $P_2O_5$: | 15 to 70 molar percent, |
| $Nb_2O_5$: | 1 to 30 molar percent |
| $TiO_2$: | 0 to 20 molar percent (excluding 0 molar percent), |
| $Bi_2O_3$: | 0 to 30 molar percent (excluding 0 molar percent), |
| $B_2O_3$: | 0 to 30 molar percent, |
| $WO_3$: | 0 to 15 molar percent (excluding 15 weight percent), |
| BaO: | 0 to 15 molar percent, |
| $Li_2O$: | 3 to 15 weight percent (excluding 3 weight percent), |
| $SiO_2$: | 0 to 5 weight percent (excluding 5 weight percent), | where the $Li_2O$, $Na_2O$, and $K_2O$ content is 0 to 15 percent (excluding 15 weight percent) and the weight ratio of ($TiO_2$ content/$Bi_2O_3$ content) is less than 0.5, which has a refractive index (nd) of greater than or equal to 1.7 and an Abbé number (vd) of less than or equal to 32;

(13) A preform for precision press molding, characterized by being comprised of an optical glass the components of which are:

| | |
|---|---|
| $P_2O_5$: | 15 to 70 molar percent, |
| $Bi_2O_3$: | 0.1 to 7 molar percent (excluding 7 molar percent), |
| $Na_2O$: | 0 to 30 molar percent, |
| $K_2O$: | 0 to 30 molar percent, | where the combined content of $Li_2O$, $Na_2O$, and $K_2O$ is less than 40 molar percent,

| | |
|---|---|
| ZnO: | 0 to 35 molar percent, |
| CaO: | 0 to 35 molar percent, |
| BaO: | 0 to 50 molar percent, |
| $Nb_2O_5$: | 0 to 35 molar percent |
| $WO_3$: | 0 to 25 molar percent, | where the combined content of $Nb_2O_5$ and $WO_3$ exceeds 0 molar percent, $SiO_2$: 0 to 5 weight percent (excluding 5 weight percent), where 0 to 1 weight percent of $Sb_2O_3$ is added to the total content of glass components, which has an Abbé number (vd) exceeding 32;

(14) A preform for precision press molding, characterized by being comprised of an optical glass the components of which are:

| | |
|---|---|
| $P_2O_5$: | 15 to 70 molar percent, |
| $Bi_2O_3$: | 0.1 to 7 molar percent (excluding 7 molar percent), |
| $Li_2O$: | 10 to 40 molar percent (excluding 10 molar percent and 40 molar percent), |
| $Na_2O$: | 0 to 30 molar percent, |
| $K_2O$: | 0 to 30 molar percent, | where the combined content of $Li_2O$, $Na_2O$, and $K_2O$ is less than 40 molar percent,

| | |
|---|---|
| ZnO: | 0 to 35 molar percent, |
| CaO: | 0 to 35 molar percent, |
| BaO: | 0 to 50 molar percent, |
| $Nb_2O_5$: | 0 to 35 molar percent |
| $WO_3$: | 0 to 25 molar percent, |
| $SiO_2$: | 0 to 5 weight percent (excluding 5 weight percent), | where 0 to 1 weight percent of $Sb_2O_3$ is added to the total content of glass components, which has an Abbé number (vd) exceeding 32;

(15) A preform for precision press molding, characterized by being comprised of an optical glass the components of which are:

| | |
|---|---|
| $P_2O_5$: | 15 to 70 molar percent, |
| $Bi_2O_3$: | 0.1 to 7 molar percent (excluding 7 molar percent), |
| $Na_2O$: | 0 to 30 molar percent, |
| $K_2O$: | 0 to 30 molar percent, | where the combined content of $Li_2O$, $Na_2O$, and $K_2O$ is less than 40 molar percent,

| | |
|---|---|
| ZnO: | 0 to 35 molar percent, |
| CaO: | 0 to 35 molar percent, |
| BaO: | 20 to 50 molar percent (excluding 20 molar percent), |
| $Nb_2O_5$: | 0 to 35 molar percent |
| $WO_3$: | 0 to 25 molar percent, |
| $SiO_2$: | 0 to 5 weight percent (excluding 5 weight percent), | where 0 to 1 weight percent of $Sb_2O_3$ is added to the total content of glass components, which has an Abbé number (vd) exceeding 32;

(16) a preform for precision press molding, characterized by being comprised of an optical glass comprising essential components in the form of 15 to 70 molar percent of $P_2O_5$, more than 4 weight percent and less than or equal to 30 molar percent of $Bi_2O_3$, a quantity of $TiO_2$ of less than 0.5 times the content by weight of $Bi_2O_3$, and 0 to 5 weight percent (excluding 5 weight percent) of $SiO_2$, and having an Abbé number (vd) of less than or equal to 32; and by being formed by solidifying glass the entire surface of which is in a molten state;

(17) a preform for precision press molding, characterized by being comprised of an optical glass comprising essential components in the form of 15 to 70 molar percent of $P_2O_5$, $Bi_2O_3$, and $B_2O_3$, a quantity of $TiO_2$ of less than 0.5 times the content by weight of $Bi_2O_3$, and 0 to 5 weight percent (excluding 5 weight percent) of $SiO_2$, and having an Abbé number (vd) of less than or equal to 32; and by being formed by solidifying glass the entire surface of which is in a molten state;

(18) a preform for precision press molding, characterized by being comprised of an optical glass comprising essential components in the form of 15 to 70 molar percent of $P_2O_5$ and $Bi_2O_3$, optional components in the form of 0 to 15 weight percent (excluding 15 weight percent) of $WO_3$, a quantity of $TiO_2$ of less than 0.5 times the content by weight of $Bi_2O_3$, and 0 to 5 weight percent (excluding 5 weight percent) of $SiO_2$, and having an Abbé number (vd) of less than or equal to 32; and by being formed by solidifying glass the entire surface of which is in a molten state;

(19) a preform for precision press molding, characterized by being comprised of an optical glass comprising essential components in the form of 15 to 70 molar percent of $P_2O_5$ and $Bi_2O_3$, a quantity of $TiO_2$ of less than 0.5 times the content by weight of $Bi_2O_3$, and 0 to 5 weight percent (excluding 5 weight percent) of $SiO_2$, and having an Abbé number (vd) of less than or equal to 32; and by being formed by solidifying glass the entire surface of which is in a molten state;

(20) a preform for precision press molding, characterized by being comprised of an optical glass comprising essential components in the form of 15 to 70 molar percent of $P_2O_5$, more than 4 weight percent and less than or equal to 30 molar percent of $Bi_2O_3$, a quantity of $TiO_2$ of less than 0.5 times the content by weight of $Bi_2O_3$, and 0 to 5 weight percent (excluding 5 weight percent) of $SiO_2$; and by being formed by solidifying glass the entire surface of which is in a molten state;

(21) a preform for precision press molding, characterized by being comprised of an optical glass comprising essential components in the form of 15 to 70 molar percent of $P_2O_5$, $Bi_2O_3$, and $Bi_2O_3$, a quantity of $TiO_2$ of less than 0.5 times the content by weight $Bi_2O_3$, and 0 to 5 weight percent (excluding 5 weight percent) of $SiO_2$; and in that the entire surface thereof is a free surface;

(22) a preform for precision press molding, characterized by being comprised of an optical glass comprising essential components in the form of 15 to 70 molar percent of $P_2O_5$ and $Bi_2O_3$, optional components in the form of 0 to 15 weight percent (excluding 15 weight percent) of $WO_3$, a quantity of $TiO_2$ of less than 0.5 times the content by weight of $Bi_2O_3$, and 0 to 5 weight percent (excluding 5 weight percent) of $SiO_2$; and in that the entire surface thereof is a free surface;

(23) a preform for precision press molding, characterized by being comprised of an optical glass comprising essential components in the form of 15 to 70 molar percent of $P_2O_5$ and $Bi_2O_3$, a quantity of $TiO_2$ of less than 0.5 times the content by weight of $Bi_2O_3$, and 0 to 5 weight percent (excluding 5 weight percent) of $SiO_2$, and having an Abbé number (vd) of less than or equal to 32; and in that the entire surface thereof is a free surface;

(24) a method of manufacturing a preform for precision press molding, characterized in that a glass melt gob of prescribed weight is separated from a glass melt flowing out of a flow pipe and up to solidification of the glass melt gob, a preform according to any of (1) to (23) above with a weight equal to the above prescribed weight is formed.

(25) an optical element obtained by precision press molding the preform according to any of (1) to (23) above or a preform manufactured by the manufacturing method according to (24).

(26) A method of manufacturing an optical element characterized in that in a method of manufacturing an optical element by heating a glass preform and conducting precision press molding, the preform according to any of (1) to (23) above or a preform manufactured by the manufacturing method according to (24) above is heated and precision press molded with a pressing mold.

(27) The method of manufacturing an optical element according to (26) above wherein the preform and pressing mold are both heated and precision press molding is conducted.

(28) The method of manufacturing an optical article according to (26) above, wherein a heated preform is introduced into a pressing mold that has been preheated separately from said preform and precision press molding is conducted.

Figure 1:
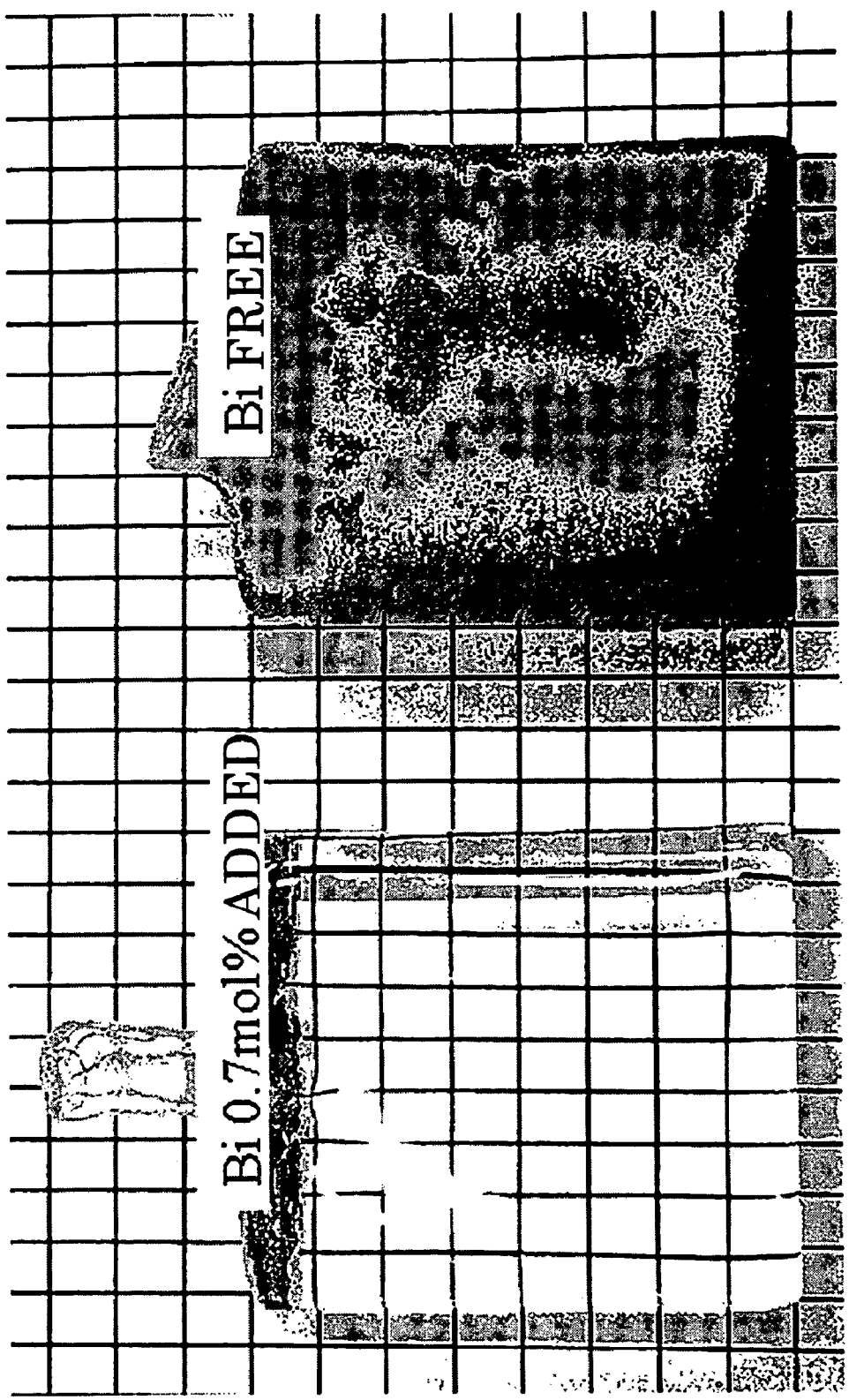
FIG. 1 demonstrates the results of tests conducted to confirm the effect of introducing $Bi_2O_3$. In contrast to the glass (left) containing $Bi_2O_3$ of Embodiment 25, which is transparent, the glass (right) obtained by removing $Bi_2O_3$ from the composition crystallized, losing transparency completely.

The present invention provides preforms for precision press molding made of glass suited to precision press molding having a broad range of dispersion characteristics, a low glass transition temperature, a low sag point, and good resistance to devitrification while containing no PbO, and a method of manufacturing the same.

The present invention further provides an optical element obtained by precision press molding the above preform, and a method of manufacturing by precision press molding a good optical element employing the above preform.

BEST MODE OF IMPLEMENTING THE INVENTION

To achieve the above-stated objects, the present inventors conducted various tests, resulting in the discovery that by incorporating $Bi_2O_3$ into $P_2O_5$-based glass of a prescribed composition not containing PbO, it was possible to increase the thermal stability of the glass production range and set a wide range of refractive indexes (nd) and Abbé numbers (vd). It was also possible to develop preforms for precision press molding permitting the precision press molding of optical elements with good stability and mass production properties. The present invention was devised on that basis.

In the present invention, the term "precision press molding" refers to a press molding method in which a glass preform is heated into a state permitting press molding and a pressing mold is used to press mold the preform to precisely transfer to the preform in the above state the molding surface of the pressing mold, thereby producing a desired article (final product) without mechanical processing such as polishing or grinding of the molded article following press molding. This molding method is normally employed to mold optical elements (for example, lenses and prisms). In the precision press molding of optical elements, for example, an optically functional surface (a surface of the optical element performing an optical function such as passing or reflecting the optical axis to be controlled) is formed by precise transfer of the molding surface of the pressing mold, permitting performance as an optically functional surface at least without mechanical processing of the optically functional surface following press molding. Generally, methods of press molding optical elements by such a method are referred to as mold optics molding. Since neither grinding nor polishing of the optically functional surface into an aspherical surface is required, this method is particularly suited to production in the precision press molding of aspherical lenses.

Precision press molding is capable of the highly efficient mass production of products requiring high surface precision and internal quality, such as optical elements. However, the adapted preform is limited to glass capable of plastic deformation at relatively low temperatures. When a preform having a high glass transition temperature is employed, the molding surface of the pressing mold also increases in temperature during precision press molding, causing extreme abrasion and even damaging the molding surface. In precision press molding, when even microdefects are generated in the molding surface of the pressing mold, they are transferred to the optically functional surface of the optical element that is the final product, and the optical element loses its optical properties. Thus, the preform that is employed must be made of glass with a low glass transition temperature.

The word "preform" is used here to mean a body that has been premolded to a prescribed shape. The term "preform for precision press molding" comprised of optical glass refers to a premolded body of optical glass that is supplied to precision press molding in a heat-softened state. In the present Specification below, unless specifically stated otherwise, the term "preform" refers to a preform for precision press molding.

In particular, in the "preform for precision press molding" of the present invention, what is meant is a preform the weight of which has been set to precisely match the weight of a precision press-molded article. Based on the weight of the desired precision press-molded article, when the weight of the preform is excessively low, the glass does not adequately fill the molding surface of the pressing mold during precision press molding, precluding desired surface precision. There is also a problem in that the thickness of the molded article is less than desired. When the weight of the preform is excessively high, the excess glass enters the crack between the pressing molds, resulting in molding burrs or a molded article that is undesirably thick. Accordingly, the weight of the preform used in precision press molding must be controlled more precisely than for glass materials employed in general press molding where the optically functional surface or the like is finished by grinding or polishing following press molding.

The shape of the preform is set based on the shape of the precision press-molded article. The optical element is often an item such as a lens having rotational symmetry. Thus, the shape of the preform is desirably one having an axis of rotational symmetry, especially, is one having symmetry with respect to rotary of a certain angle around an axis of rotational symmetry. Specific examples are spheres and items having one axis of rotational symmetry. Examples of shapes having one axis of rotational symmetry are shapes having smooth contour lines without angles or indentations in the cross-section containing the axis of rotational symmetry, such as shapes having elliptical contour lines in which the minor axis in the cross-section corresponds to the axis of rotational symmetry. The shape is desirably one in which, when the angle of one of the angles formed between the line connecting a point on the contour line of the preform in the above-mentioned cross-section with the center of gravity of the preform on the rotational axis of symmetry and the tangent touching the contour line at a point on the above-mentioned contour line is denoted as θ, and when that point is moved from some point on the rotational axis of symmetry along the contour line, θ increases monotonically from 90°, decreases monotonically, and then increases monotonically, and a 90° angle is formed at the other point of intersection with the rotational axis of symmetry.

Due to the characteristics of precision press molding, the preform desirably does not have defects such as striae, cracks, clouding, or devitrification, either internally or on the surface. The surface of the preform is also desirably smooth. This is because the surface of the preform remains on the final product as the surface of the precision press-molded article.

The preform of the present invention will be described in detail next. The preform of the present invention can be classified into the nine types sequentially described below, and each of these types can be more finely classified.

The first preform (referred to as "Preform 1" below) is characterized by being comprised of an optical glass the components of which are:

| | |
|---|---|
| $P_2O_5$: | 15 to 70 molar percent, |
| $Nb_2O_5$: | 1 to 30 molar percent |
| $TiO_2$: | 0 to 20 molar percent (excluding 0 molar percent), |
| $Bi_2O_3$: | 6 to 30 molar percent (excluding 6 molar percent), |
| $B_2O_3$: | 0 to 30 molar percent, |
| $WO_3$: | 1 to 20 molar percent, |
| $SiO_2$: | 0 to 5 weight percent (excluding 5 weight percent), and |
| ZnO: | 0 to 10 weight percent (excluding 10 weight percent), | which has a refractive index (nd) of greater than or equal to 1.7 and an Abbé number (vd) of less than or equal to 32.

Preform 1 can be more specifically divided into Preforms 1-1 to 1-3.

Preform 1-1 is Preform 1 in which the optical glass contains more than 4 weight percent of $Bi_2O_3$ and from 3 to 15 weight percent of $Li_2O$ (excluding 3 weight percent).

Preform 1-2 is Preform 1 in which the optical glass contains essential components in the form of $B_2O_3$ and $Li_2O$, and $Li_2O$ is contained in a proportion of 3 to 15 weight percent (excluding 3 weight percent).

Preform 1-3 is Preform 1 in which the optical glass contains less than 15 weight percent of $WO_3$ (where this quantity is 0 to 15 molar percent) and from 3 to 15 weight percent of $Li_2O$ (excluding 3 weight percent).

Each of Preforms 1-1 to 1-3 desirably contains an optional component in the form of 0 to 15 molar percent of BaO, less than 10 weight percent of $Na_2O$ and $K_2O$ combined, and less than 5 weight percent of TiO2, with from 0 to 1 weight percent of $Sb_2O_3$ relative to the combined quantity of all glass components also desirably being added.

The second preform (referred to as "Preform 2" below) is characterized by being comprised of an optical glass the components of which are:

| | |
|---|---|
| $P_2O_5$: | 15 to 70 molar percent, |
| $Nb_2O_5$: | 1 to 30 molar percent |
| $TiO_2$: | 0 to 20 molar percent (excluding 0 molar percent), |
| $Bi_2O_3$: | 6 to 30 molar percent (excluding 6 molar percent), |
| $B_2O_3$: | 0 to 30 molar percent, |
| $WO_3$: | 1 to 20 molar percent, |
| $SiO_2$: | 0 to 5 weight percent (excluding 5 weight percent), | where the combined $Li_2O$, $Na_2O$, and $K_2O$ content is 0 to 15 percent (excluding 15 weight percent); which has a refractive index (nd) of greater than or equal to 1.7 and an Abbé number (vd) of less than or equal to 32;

Preform 2 can be more specifically divided into Preforms 2-1 to 2-3.

Preform 2-1 is Preform 2 in which the optical glass contains more than 4 weight percent of $Bi_2O_3$ and 3 to 15 weight percent of $Li_2O$ (excluding 3 weight percent).

Preform 2-2 is Preform 2 in which the optical glass contains essential components in the form of $B_2O_3$ and $Li_2O$, with the proportion of $Li_2O$ being 3 to 15 weight percent (excluding 3 weight percent).

Preform 2-3 is Preform 2 in which the optical glass contains less than 15 weight percent of $WO_3$ (from 0 to 15 molar percent) and 3 to 15 weight percent (excluding 3 weight percent) of $Li_2O$.

Each of Preforms 2-1 to 2-3 desirably contains an optional component in the form of 0 to 15 molar percent of BaO, less than 10 weight percent of $Na_2O$ and $K_2O$ combined, and less than 5 weight percent of TiO2, with and from 0 to 1 weight percent of $Sb_2O_3$ relative to the combined quantity of all glass components also desirably being added. Further, the weight ratio of ($TiO_2$ content/$Bi_2O_3$ content) is also desirably less than 0.5.

The third preform (referred to as "Preform 3" below) is characterized by being comprised of an optical glass the components of which are:

| | |
|---|---|
| $P_2O_5$: | 15 to 70 molar percent, |
| $Nb_2O_5$: | 1 to 30 molar percent |
| $TiO_2$: | 0 to 20 molar percent (excluding 0 molar percent), |
| $Bi_2O_3$: | 0 to 30 molar percent (excluding 0 molar percent), |
| $B_2O_3$: | 0 to 30 molar percent, |
| $WO_3$: | 1 to 20 molar percent, |
| $SiO_2$: | 0 to 5 weight percent (excluding 5 weight percent), |
| ZnO: | 0 to 10 weight percent (excluding 10 weight percent); | where the weight ratio of ($TiO_2$ content/$BiO_2$ content) is less than 0.5; which has a refractive index (nd) of greater than or equal to 1.7 and an Abbé number (vd) of less than or equal to 32.

Preform 3 can be more specifically divided into Preforms 3-1 to 3-3.

Preform 3-1 is Preform 3 in which the optical glass contains more than 4 weight percent of $Bi_2O_3$ and 3 to 15 weight percent of $Li_2O$ (excluding 3 weight percent).

Preform 3-2 is Preform 3 in which the optical glass contains essential components in the form of $B_2O_3$ and $Li_2O$, with the proportion of $Li_2O$ being 3 to 15 weight percent (excluding 3 weight percent).

Preform 3-3 is Preform 3 in which the optical glass contains less than 15 weight percent of $WO_3$ (from 0 to 15 molar percent) and 3 to 15 weight percent (excluding 3 weight percent) of $Li_2O$.

Each of Preforms 3-1 to 3-3 desirably contains an optional component in the form of 0 to 15 molar percent of BaO, contains less than 10 weight percent of $Na_2O$ and $K_2O$ combined, contains $Nb_2O_5$, and contains less than 5 weight percent of $TiO_2$, with the weight ratio of (TiO2 content/$Nb_2O_5$ content) being less than 0.1. From 0 to 1 weight percent of $Sb_2O_3$ relative to the combined quantity of all glass components is also desirably added.

The fourth (referred to as "Preform 4" below) is characterized by being comprised of an optical glass the components of which are:

| | |
|---|---|
| $P_2O_5$: | 15 to 70 molar percent, |
| $Nb_2O_5$: | 1 to 30 molar percent |
| $TiO_2$: | 0 to 20 molar percent (excluding 0 molar percent), |
| $Bi_2O_3$: | 0 to 30 molar percent (excluding 0 molar percent), |
| $B_2O_3$: | 0 to 30 molar percent, |
| $WO_3$: | 1 to 20 molar percent, |
| $SiO_2$: | 0 to 5 weight percent (excluding 5 weight percent), |

0 to 15 weight percent (excluding 15 weight percent) of $Li_2O$, $Na_2O$, and $K_2O$, and a weight ratio of ($TiO_2$ content/$Bi_2O_3$ content) of less than 0.5; which has a refractive index (nd) of greater than or equal to 1.7 and an Abbé number (vd) of less than or equal to 32.

Preform 4 can be more specifically divided into Preforms 4-1 to 4-3.

Preform 4-1 is Preform 4 in which the optical glass contains more than 4 weight percent of $Bi_2O_3$ and 3 to 15 weight percent of $Li_2O$ (excluding 3 weight percent).

Preform 4-2 is Preform [1 sic, 4] in which the optical glass contains essential components in the form of $B_2O_3$ and $Li_2O$, with the proportion of $Li_2O$ being 3 to 15 weight percent (excluding 3 weight percent).

Preform 4-3 is Preform 4 in which the optical glass contains less than 15 weight percent of $WO_3$ (from 0 to 15 molar percent) and 3 to 15 weight percent (excluding 3 weight percent) of $Li_2O$.

Each of Preforms 4-1 to 4-3 desirably contains an optional component in the form of 0 to 15 molar percent of BaO. The optical glass contains $Nb_2O_5$, contains less than 10 weight percent of $Na_2O$ and $K_2O$ combined, and contains less than 5 weight percent of $TiO_2$, with the weight ratio of ($TiO_2$ content/$Nb_2O_5$ content) being less than 0.1. From 0 to 1 weight percent of $Sb_2O_3$ relative to the combined quantity of all glass components is also desirably added. The content of $Bi_2O_3$ desirably exceeds 6 weight percent.

The reasons for the compositional limits to the glasses comprising Preforms 1 to 4 are described below.

$P_2O_5$ is a constituent component of the network structure of the glass, and is an essential component for imparting to the glass the stability required for manufacturing. However, when the content of $P_2O_5$ exceeds 70 molar percent, the glass transition temperature and sag point rise and weatherability deteriorates. At less than 15 molar percent, the tendency of the glass to devitrify becomes strong and the glass is unstable. Thus, the $P_2O_5$ content is set to from 15 to 70 molar percent. The $P_2O_5$ content desirably falls within a range of 17 to 67 percent.

$Nb_2O_5$ is an optional component that is desirably incorporated to impart characteristics to the glass such as a high refractive index and high dispersion without adding PbO. However, when incorporated in excessively high quantity, the glass transition temperature and sag point rise, stability deteriorates, and high-temperature melt properties deteriorate. Further, the problems of foaming and coloration also occur during precision press molding of the glass. Thus, the content is desirably limited to a range of 1 to 30 molar percent, preferably a range of 5 to 25 molar percent, and more preferably a range of 5 to 20 molar percent. From the perspective of obtaining a high refractive index, high dispersion characteristics, enhanced devitrification stability, good high temperature melt properties, a low glass transition temperature, and a low sag point while preventing foaming and coloration during precision press molding, the quantity of $Nb_2O_5$ incorporated is set along with the quantity of $TiO_2$ incorporated to achieve a weight ratio of (TiO2 content/$Nb_2O_5$ content) of less than 0.1.

$TiO_2$, an essential component, has the effects of enhancing the refractive index and dispersion property of the glass and improving devitrification stability. Thus, it is incorporated more than 0 (zero) molar percent. However, when the content exceeds 20 molar percent, the devitrification stability and transmittance of the glass deteriorate, the sag point and liquid-phase temperature rise sharply, and the glass tends to discolor during precision press molding. Thus, the content is limited to 0 to 20 molar percent (excluding 0 molar percent).

The desired range of the $TiO_2$ content is from 0.5 to 20 molar percent, the preferred range is from 0.5 to 15 molar percent, and the more preferred range is from 0.5 to 12 molar percent.

In particular, when a preform for precision press molding is manufactured by forming a glass melt gob, if the glass stability is low, the resulting preform devitrifies. If the glass melt flowing temperature sets to a higher temperature, it is hard to prepare a preform for precision press molding with high quality due to low glass viscosity. In order to solve these problems, $TiO_2$ is also an essential component. Within the above listed ranges, the $TiO_2$ content is more preferably from 1 to 10 molar percent, still more preferably from 2 to 8 molar percent from the perspective of imparting a high refractive index and a high dispersion property and preparing a preform for precision press molding by forming a glass melt gob.

$Bi_2O_3$, another essential component, imparts a high refractive index and a high dispersion property to the glass. $Bi_2O_3$ greatly broadens the glass production range both at high and low $P_2O_5$ contents, and has a stabilizing effect. It is also a component that increases the weatherability of the glass. $Bi_2O_3$ increases the wetting angle of platinum and platinum alloys by the glass in a molten state, and enhances the suppression of wetting when forming preforms for precision pressing by the drip method or drop-cut method, described further below, where a glass melt is caused to flow out of a platinum or gold-containing platinum alloy pipe. Thus, it plays important roles in increasing the weight precision of the preform and preventing surface striae. However, when the content exceeds 30 molar percent, the glass tends to devitrify and color.

The standard for setting lower limits to the $Bi_2O_3$ content is different for Preforms 1 and 2 than for Preforms 3 and 4. To render Preforms 1 and 2 more stable and impart better preform characteristics, $Bi_2O_3$ is incorporated in a quantity exceeding 6 molar percent, desirably greater than or equal to 6.5 molar percent. For the above-stated reasons, $Bi_2O_3$ is incorporated into Preforms 1 and 2 in a proportion of greater than 6 molar percent but less than or equal to 30 molar percent, desirably 6.5 to 30 molar percent, preferably 6.5 to 25 molar percent, more preferably 6.5 to 15 molar percent, and still more preferably 6.5 to 10 molar percent.

To impart greater glass stability and better preform characteristics to Preforms 3 and 4, $Bi_2O_3$ is incorporated within a range of 0 to 30 molar percent (excluding 0 molar percent), and the lower limit of the $Bi_2O_3$ content is established in relation to the quantity of $TiO_2$ present. That is, the quantities of $TiO_2$ and $Bi_2O_3$ are set so that the weight ratio of ($TiO_2$ content/$Bi_2O_3$ content) is less than 0.5. The preferred range of this weight ratio is greater than 0 and less than or equal to 0.4. Both $TiO_2$ and $Bi_2O_3$ are components that impart a high refractive index and a high dispersion property to the glass. Comparing $TiO_2$ and $Bi_2O_3$, the incorporation of a larger quantity of $Bi_2O_3$ is desirable from the perspective of increasing the stability of the glass and improving the wetting property of the glass melt to achieve the above-stated optical characteristics. A detailed examination of the quantities of $TiO_2$ and $Bi_2O_3$ introduced was conducted from this perspective, revealing that it sufficed to specify the quantities incorporated of these two components by the above weight ratio. The content of $Bi_2O_3$ is desirably 0.5 to 30 molar percent, preferably 0.5 to 25 molar percent, more preferably 0.5 to 15 molar percent, still more preferably 1 to 15 molar percent, further more preferably more than 2 molar percent to less than or equal to 15 molar percent, still further more preferably more than 2 molar percent to less than or equal to 10 molar percent.

In Preforms 1-1, 2-1, 3-1, and 4-1, the quantity of $Bi_2O_3$ incorporated is set to greater than 4 weight percent, desirably greater than or equal to 4.5 weight percent, and preferably greater than or equal to 5 weight percent. This further increases the stability and weatherability of the glass and heightens the inhibitory effect on increased wetting by the glass as well as the following effects. When a glass melt is caused to flow out of a flowing pipe such as a platinum or gold-containing platinum alloy pipe for a long time period, the internal surface of the pipe is roughened to form minute uneven, resulting in disorder of glass flow. When a preform for precision press molding is prepared from flowing out glass melt, the glass flow with disorder results in preparation of poor products with striae. If a glass melt containing $Bi_2O_3$ is caused to flow out of the flowing pipe for a long time period, the inter surface of the pipe is kept smooth and does not lose its gloss. If a glass melt containing $Bi_2O_3$ is caused to flow out of a flowing pipe with uneven internal surface, metallic gloss of the pipe surface is recovered. While suppressing occasion of striae by using this effect, it is possible to prepare a preform for precision press molding with high quality in high productivity. In addition, as mentioned above, a glass melt containing $Bi_2O_3$ has a property preventing wetting a flow pipe. The glass wetted to the pipe deteriorates and the deteriorated glass is incorporated into a glass melt flowed out, resulting in lowering quality of a preform. However, wetting of glass melt is reduced by incorporation of $Bi_2O_3$ and lowering of a preform quality can be prevented. When forming preforms by dripping a glass melt from a pipe, wetting of glass melt may deteriorate weight accuracy of preforms. However, wetting of glass melt is reduced by incorporation of $Bi_2O_3$ and preforms can be prepared while keeping high weight accuracy.

$B_2O_3$ is an optional component. A component that both improves the molten properties of the glass and is extremely effective at homogenizing the glass, the addition of a small quantity of $B_2O_3$ changes the bonding properties of OH groups in the glass and is extremely effective at preventing foaming of the glass during precision press molding. Accordingly, $B_2O_3$ is incorporated into Preforms 1-2, 2-2, 3-2, and 4-2 as an essential component to improve these effects. However, when 30 molar percent is exceeded, the weatherability of the glass deteriorates and the glass becomes unstable. Thus, the content is limited to within the range of from 0 to less than or equal to 30 molar percent. The $B_2O_3$ content is desirably 1 to 30 molar percent, preferably 1 to 25 molar percent.

$WO_3$ is a component that reduces the glass transition temperature without the use of PbO and imparts a high refractive index and high dispersion properties to the glass. $WO_3$ has the effect of lowering the glass transition temperature and sag point in the same manner as alkali metal oxides, and increases the refractive index. It also suppresses the wetting property of the pressing mold by the preform, thus decreasing in the adhesion of the glass to the mold during precision press molding. It has and effect of suppressing glass foaming during precision press molding as well. However, when incorporated in excessively large quantity, the preform tends to color and the high-temperature viscosity of the glass tends to drop, making it difficult to mold preforms for precision press molding from a glass melt flowing out of a flow pipe. In addition, it tends to occur radial micro-scratching defects on the surface of the precision press molded products. Accordingly, the content is set to 1 to 20 molar percent. The content of $WO_3$ desirably falls within a range of 2 to 20 molar percent, more preferably within a range of 2.5 to 20 molar percent.

To achieve an adequate $WO_3$ incorporation effect, the ratio of W to the combined quantity of Nb, W, Ti, and Bi in the cationic ratio (W/(Nb+W+Ti+Bi)) is desirably greater than or equal to 0.035, preferably greater than or equal to 0.04, more preferably greater than or equal to 0.045, and still more preferably greater than or equal to 0.05. The upper limit of the W/(Nb+W+Ti+Bi) is about 0.2.

In Preforms 1-3, 2-3, 3-3, and 4-3, the quantity of $WO_3$ incorporated is less than 15 weight percent (0 to 15 molar percent), desirably less than or equal to 14.5 weight percent, and preferably less than or equal to 14 weight percent. In these cases, incorporation of $WO_3$ is preferred, and the quantity of $WO_3$ incorporated sets to more preferably from 1 to 15 molar percent in Preforms 1-3, 2-3, 3-3, and 4-3.

In Preforms 1-1, 1-2, 2-1, 2-2, 3-1, 3-2, 4-1, and 4-2, the quantity of $WO_3$ incorporated is less than 15 weight percent (0 to 15 molar percent), desirably less than or equal to 14.5 weight percent, and preferably less than or equal to 14 weight percent.

$SiO_2$, an optional component, increases the glass transition temperature and sag point and makes it difficult to achieve desired optical characteristics when incorporated in excessively high quantity. Thus, the content is set to 0 to 5 weight percent (excluding 5 weight percent). The desired range of $SiO_2$ is from 0 to 4 weight percent, preferably 0 to 2 weight percent. Its absence is even more preferred. As denoted in moral percent, the desired range of $SiO_2$ is from 0 to 2 molar percent, preferably 0 to 1 molar percent.

ZnO is a component optionally incorporated to raise the refractive index and dispersion of the glass. When incorporated in small quantity, it also has the effect of lowering the glass transition temperature and sag point. However, when incorporated in large quantity, it compromises the devitrification stability of the glass and sometimes causes the liquid phase temperature to rise. Accordingly, in Preforms 1 and 3, the quantity of ZnO is set to 0 to 10 weight percent (10 weight percent excluded). In Preforms 2 and 4, when adding ZnO, a desirable content is 0 to 10 weight percent (excluding 10 weight percent). The preferred content of ZnO in all of Preforms 1 to 4 is 0 to 9 weight percent, more preferably 0.2 to 9 weight percent. As denoted in moral percent, the desired range of ZnO is from 0 to 12 molar percent, preferably 1 to 10 molar percent, more preferably 2 to 8 molar percent.

$Li_2O$, $Na_2O$, and $K_2O$ are all components incorporated to lower the glass transition temperature, sag point, and liquid-phase temperature and improve the high-temperature melt properties of the glass. However, the incorporation of excessive quantities of $Li_2O$, $Na_2O$, and $K_2O$ causes deterioration of glass stability and tends to cause deterioration of glass weatherability and durability.

Thus, in Preforms 2 and 4, the combined quantity of $Li_2O$, $Na_2O$, and $K_2O$ is set to 0 to 15 weight percent (excluding 15 weight percent). For Preforms 1 and 3, as well, the combined quantity of $Li_2O$, $Na_2O$, and $K_2O$ is desirably set to 0 to 15 weight percent (excluding 15 weight percent).

In all of Preforms 1 to 4, the combined quantity of $Li_2O$, $Na_2O$, and $K_2O$ is desirably set to 0 to 14 weight percent, preferably to 5 to 14 weight percent. As denoted in moral percent, the desired range of the combined quantity is less than 42 molar percent, preferably less than or equal to 38 molar percent.

In all of Preforms 1 to 4, the combined quantity of $Na_2O$ and $K_2O$ is desirably set to less than 10 weight percent from the perspective of improving glass stability, weatherability, and durability.

Among the alkali metal oxides, $Li_2O$ is the most effective to lower the glass transition temperature and sag point, and to increase the refractive index. Thus, in the present invention, $Li_2O$ is predominantly incorporated element. The quantity of $Li_2O$ incorporated is set to 3 to 15 weight percent (excluding 3 weight percent), desirably more than 3 weight percent and less than 15 weight percent, and preferably from 3.1 to 14.9 weight percent for all of Preforms 1 to 4. Still more preferably, the quantity incorporated falls within a range of less than or equal to 30 molar percent, more preferably less than or equal to 25 molar percent. It is particularly preferable for the quantity incorporated to satisfy the above range while constituting less than 5 weight percent. In order to impart high refractive index property and low-temperature softening prosperity at the same time, while $WO_3$ plays important roles in the high refractive index property imparting components, $Li_2O$ plays important roles in the alkali metal oxides. That is, while keeping the glass stability, in order to impart the above mentioned two properties, co-incorporation of $WO_3$ and $Li_2O$ is particularly preferred. As denoted in moral percent, the range of $Li_2O$ content is preferably from 2 to 30 molar percent, more preferably 2 to 25 molar percent, still more preferably 4 to 25 molar percent, and still further preferably 5 to 20 molar percent.

The quantity of $Na_2O$ incorporated is desirably set to within a range of 0 to 30 molar percent, preferably more than 0 percent and less than or equal to 30 molar percent, and still more preferably, 1 to 20 molar percent. It is particularly preferable for the quantity incorporated to satisfy the above range while constituting less than 5 weight percent.

The quantity of $K_2O$ incorporated desirably falls within a range of from 0 to 30 molar percent, preferably 0 to 25 molar percent, and more preferably, 0.1 to 10 molar percent. To enhance the above-described effect of incorporating $Li_2O$, the molar proportion of $Li_2O$ in the alkali metal oxides in the glass, denoted as $Li_2O/(Li_2O+Na_2O+K_2O)$, is desirably greater than or equal to 0.4, preferably greater than or equal to 0.44, and more preferably greater than or equal to 0.50.

BaO, an optional component, is effective at increasing the refractive index of the glass, increasing devitrification stability (resistance to devitrification), and lowering the liquid-phase temperature. In particular, when a large quantity of $WO_3$ is incorporated, the incorporation of BaO prevents coloration of the glass and enhances devitrification stability. When little $P_2O_5$ is incorporated, BaO has the effect of increasing the weatherability of the glass. However, when the quantity of BaO exceeds 15 molar percent, the glass becomes unstable and the glass transition temperature and sag point increase. Thus, when incorporating BaO, the content is desirably kept to 0 to 15 molar percent, preferably 0 to 12 molar percent, more preferably 0 to 11 molar percent, and even more preferably, 0 to 10 molar percent.

MgO, CaO, and SrO are optional components that can be added to adjust glass stability and weatherability. When added in excessively large quantity, the glass becomes highly unstable. Thus, the content of each of these components is desirably from 0 to 25 molar percent, and preferably from 0 to 15 molar percent. More preferably, the combined quantity of MgO, CaO, and Sr is desirably from 0 to 10 molar percent.

$Al_2O_3$, $La_2O_3$, $Gd_2O_3$, $Yb_2O_3$, $ZrO_2$, and $Ta_2O_5$ are optional components used to adjust the stability and optical constants of the glass. However, these components all raise the glass transition temperature and render precision press molding difficult. Thus, the quantities added are desirably kept to 0 to 15 molar percent of $Al_2O_3$, 0 to 10 molar percent of $La_2O_3$, 0 to 10 molar percent of $Gd_2O_3$, 0 to 10 molar percent of $Yb_2O_3$, 0 to 10 molar percent of $ZrO_2$, and 0 to 10 molar percent of $Ta_2O_5$. Preferably, the quantity of $Al_2O_3$ is set to 0 to 12 molar percent and that of each of $La_2O_3$, $Gd_2O_3$, $Yb_2O_3$, $ZrO_2$, and $Ta_2O_5$ is set to 0 to 8 molar percent. Still further, the combined quantity of $Al_2O_3$, $La_2O_3$, $Gd_2O_3$, $Yb_2O_3$, $ZrO_2$, and $Ta_2O_5$ is preferably kept to less than 5 molar percent, more preferably to less than 2 molar percent.

$Sb_2O_3$ is an effective glass clarifying agent. However, when added in excessively large quantity, the glass tends to foam during precision press molding. Thus, the content is desirably kept to 0 to 1 weight percent (excluding 1 weight percent), preferably 0 to 0.9 weight percent, of the total quantity of all glass components.

The glasses used to form Preforms 1 to 4 do not contain $Ag_2O$, $Tl_2$, or PbO. The term "do not contain" means that these components are not employed as starting materials when preparing the glass. When these components are contained as unavoidable impurities in the starting materials of other components, the term "do not contain" is satisfied. $Ag_2O$ tends to reduce readily, precipitating in the glass as microparticles of metallic silver and causing optical scattering. Thus, it is a non-essential component for achieving the object of the present invention and is not contained in Preforms 1 to 4. In particular, $Ag_2O$ tends to precipitate out during precision press molding in nonoxidizing atmospheres such as nitrogen. $Tl_2O$ is scarce and toxic, and is thus not contained in Preforms 1 to 4. The same holds true for PbO and $As_2O$; they reduce during precision press molding and precipitate out as metal salts on the surface of the precision press-molded product. They also adhere to the molds used to mold lenses in precision press molding, making it impossible to maintain the precision of the surface transferred to the precision press-molded lens and requiring maintenance to remove the metal salts adhering to the mold. This precludes mass production. There is also the problem of environmental pollution. Thus, PbO is not incorporated into Preforms 1 to 4.

The introduction of $As_2O_3$ CdO, and the like is to be avoided in consideration of the environment. The incorporation of highly volatile components is undesirable when directly forming preforms from glass melt. Accordingly, fluorine is desirably not incorporated. $TeO_2$, which is toxic, and $GeO_2$, which is expensive, and the like are also desirably not incorporated.

In the glasses used to mold Preforms 1 to 4, the combining of the individual components in any quantities falling within their above-stated desirable ranges yields a desirable combination range. However, examples of several desirable combination ranges will be given.

Examples of desirable composition ranges of Preforms 1 and 2

In Preforms 1-1 to 1-4 and 2-1 to 2-4, desirable examples are:

(1) compositions where the combined content of $Na_2O$ and $K_2O$ is less than 10 weight percent, the content of $TiO_2$ is less than 5 weight percent, and the content of $Sb_2O_3$ is from 0 to 1 weight percent of the combined quantities of all the glass components;

(2) compositions where the combined content of $Na_2O$ and $K_2O$ is less than 10 weight percent, the weight ratio of the ($TiO_2$ content/$Bi_2O_3$ content) is less than 0.5, and the content of $Sb_2O_3$ is 0 to 1 weight percent of the combined quantities of all glass components; and (3) compositions where the glass components are:

| | |
|---|---|
| $P_2O_5$: | 17 to 67 molar percent, |
| $Nb_2O_5$: | 1 to 30 molar percent (more preferably 5 to 20 molar percent) |
| $TiO_2$: | 0.5 to 12 molar percent, |
| $Bi_2O_3$: | 6.5 to 25 molar percent, |
| $B_2O_3$: | 1 to 25 molar percent, |
| $WO_3$: | 1 to 20 molar percent, |
| $SiO_2$: | 0 to 4 weight percent, |
| ZnO: | 0.2 to 9 weight percent, |
| $Li_2O$: | 1 to 25 weight percent (but less than 5 weight percent), |
| $Na_2O$: | 1 to 20 molar percent, |
| $K_2O$: | 0.1 to 10 molar percent | where the combined quantity of $Li_2O$, $Na_2O$, and $K_2O$ is 5 to 14 weight percent, BaO: 0 to 11 molar percent, and where the weight ratio of (TiO2 content/$Nb_2O_5$ content) is less than 0.1 and the quantity of $Sb_2O_3$ added is 0 to 0.9 weight percent of the combined quantity of all glass components; and (4) compositions combining (1) and (2) above; compositions combining (2) and (3) above; compositions combining (1) and (3) above; compositions combining (1), (2), and (3) above.

Examples of desirable composition ranges of Preforms 3 and 4

In Preforms 3-1 to 3-4 and 4-1 to 4-4, desirable examples are:

(5) compositions where the combined content of $Na_2O$ and $K_2O$ is less than 10 weight percent, the content of $TiO_2$ is less than 5 weight percent, $Nb_2O_5$ is incorporated, the weight ratio of (TiO2 content/$Nb_2O_5$ content) is less than 0.1, and the quantity of $Sb_2O_3$ added is 0 to 1 weight percent of the combined quantities of all of the glass components;

(6) compositions where the $Bi_2O_3$ content exceeds 6 weight percent, the combined quantity of $Na_2O$ and $K_2O$ is less than 10 weight percent, the quantity of $TiO_2$ is less than 5 weight percent, and the quantity of $Sb_2O_3$ added is from 0 to 1 weight percent of the combined quantities of all glass components;

(7) compositions where the glass components are:

| | |
|---|---|
| $P_2O_5$: | 17 to 67 molar percent, |
| $Nb_2O_5$: | 5 to 20 molar percent |
| $TiO_2$: | 0.5 to 12 molar percent, |
| $B_2O_3$: | 1 to 25 molar percent, |
| $WO_3$: | 1 to 20 molar percent, |
| $SiO_2$: | 0 to 4 weight percent, |
| ZnO: | 0.2 to 9 weight percent, |
| $Li_2O$, $Na_2O$, and $K_2O$: | 5 to 14 weight percent, |
| $Li_2O$: | 1 to 25 molar percent (less than 5 weight percent) |
| $Na_2O$: | 1 to 20 molar percent, |
| $K_2O$: | 0.1 to 10 molar percent |
| BaO: | 0 to 11 molar percent, and | where $Bi_2O_3$ is incorporated in a weight ratio of ($TiO_2$ content/$Bi_2O_3$ content) of greater than 0 and less than or equal to 0.4, the weight ratio of (TiO2 content/$Nb_2O_5$ content) is less than 0.1, and $Sb_2O_3$ is added in a quantity of 0 to 0.9 weight percent of the combined quantities of all glass components.

Examples of desirable composition ranges of Preforms 1 to 4

In Preforms 1 to 4, desirable examples are:

(8) compositions where the $Na_2O$ content is less than 5 weight percent;

(9) compositions where the $SiO_2$ content is 0 to 2 weight percent (it being preferred that $SiO_2$ not be incorporated at all);

(10) the combined contents of $P_2O_5$, $Nb_2O_5$, $TiO_2$, $Bi_2O_3$, $B_2O_3$, $WO_3$, $SiO_2$, ZnO, $Li_2O$, $Na_2O$, $K_2O$, and BaO exceed 95 molar percent;

(11) the combined contents of $P_2O_5$, $Nb_2O_5$, $TiO_2$, $Bi_2O_3$, $B_2O_3$, $WO_3$, $SiO_2$, ZnO, $Li_2O$, $Na_2O$, $K_2O$, and BaO exceed 98 molar percent;

(12) the combined contents of $P_2O_5$, $Nb_2O_5$, $TiO_2$, $Bi_2O_3$, $B_2O_3$, $WO_3$, $SiO_2$, ZnO, $Li_2O$, $Na_2O$, $K_2O$, and BaO exceed 99 molar percent; and

(13) the combined contents of $P_2O_5$, $Nb_2O_5$, $TiO_2$, $Bi_2O_3$, $B_2O_3$, $WO_3$, $SiO_2$, ZnO, $Li_2O$, $Na_2O$, $K_2O$, and BaO constitute 100 molar percent and $Sb_2O_3$ is added in a quantity of 0 to 0.9 weight percent of the combined quantities of all glass components.

To achieve greater glass stability, a lower glass transition temperature, and less coloration, the refractive index (nd) is desirably set to 1.7 to 2.0 and the Abbé number (vd) to within the range of 20 to 32 in Preforms 1 to 4. In glasses having the glass compositions of the ranges specified in the claims, the refractive index (nd) is basically 1.7 to 2.0 and the Abbé number (vd) 20 to 32. The glass composition can be adjusted within the ranges specified in the claims to obtain glass preforms that have a refractive index and Abbé number falling within the above-stated ranges and achieve glass stability, a low glass transition temperature, and low coloration. The glasses of the above mentioned preforms have not only high refractive index but also low-temperature softening property suited for precision press molding and the excellent stability enabling formation of a preform directly from a glass gob in the melt state. Thus, the refractive index (nd) of more than or equal to 1.80 is more effective and that of more than or equal to 1.83 is further more effective.

In Preforms 1 to 4, to lower the temperature of the pressing mold in precision press molding, the glass transition temperature (Tg) is desirably kept to less than or equal to 600° C., preferably less than or equal to 550° C., and more preferably less than or equal to 500° C. The sag point (Ts) is desirably kept to less than or equal to 650° C., preferably less than or equal to 600° C., and more preferably to less than or equal to 550° C.

Glasses having glass compositions falling within the ranges specified in the claims basically have glass transition temperatures and sag points falling within the above-stated ranges. Glass preforms having glass transition temperatures and sag points falling within the above-stated ranges can be obtained by adjusting the glass compositions within the ranges stated in the claims.

The wavelength within the range of 280 to 700 nm at which spectral transmittance reaches 80 percent (denoted as λ80 below), when converted to a glass thickness of 10.0±0.1 mm, is desirably less than or equal to 570 nm, preferably less than or equal to 550 nm, and more preferably less than or equal to 520 nm. The wavelength at which this spectral transmittance reaches 5 percent (denoted below as λ5) is desirably less than or equal to 400 nm, preferably less than or equal to 390 nm.

Glasses having glass compositions falling within the ranges specified in the claims basically have the above-stated λ80 and 2 5 ranges. Glass preforms having λ80 and λ5 values falling within the above-stated ranges can be obtained by adjusting the glass compositions within the ranges stated in the claims.

Plate-shaped samples 10.0±0.1 mm in thickness comprised of the same optical glass as is used to mold the preforms, two sides of which have been optically ground, can be used to test the above spectral transmittance. The spectral transmittance is the ratio of the amount of light transmitted by the sample to the amount of perpendicular incident light on the sample surface (amount of transmitted light/amount of incident light). Losses such as reflection loss on the sample surface, absorption within the sample, and scattering are included in the difference between the amount of incident light and the amount of transmitted light. When the thickness of the sample is not 10.0±0.1 mm, it suffices to convert the spectral transmittance of the sample to that corresponding to a thickness of 10.0±0.1 mm by the known method.

The above glass exhibits a spectral transmittance value of greater than or equal to 5 percent as converted to a thickness of 10.0±0.1 mm over the range of λ5 to 700 nm and a spectral transmittance value of greater than or equal to 80 percent as converted to a thickness of 10.0±0.1 mm over the range of λ80 to 700.

The liquid-phase (LT) temperature of the above-described glass is desirably less than 1,000° C., preferably less than 960° C., to mold high-quality preforms from glass melt.

Glasses having glass compositions falling within the ranges specified in the claims basically have a liquid-phase temperature (LT) within the stated range. Glass preforms having a liquid-phase temperature (LT) falling within the above-stated range can be obtained by adjusting the glass composition within the ranges specified in the claims.

The preferred specific gravity falls within a range of from 3.4 to 4.5. The preferred range of the average coefficient of linear expansion (α) from 100 to 300° C. is from 90 to 140×$10^{-7}$/° C. Glasses having glass compositions falling within the ranges specified in the claims basically have specific gravity values and average coefficients of linear expansion falling within the above-stated ranges. Preforms having specific gravity values and average coefficients of linear expansion falling within the above-stated ranges can be obtained by adjusting the glass composition within the ranges specified in the claims.

The methods used to measure various physical properties are described in the embodiments.

Preforms comprised of optical glass having an Abbé number (vd) exceeding 32 will be described next.

The fifth preform (referred to hereinafter as "Preform 5") is characterized by being comprised of an optical glass the components of which are:

| | |
|---|---|
| $P_2O_5$: | 15 to 70 molar percent, |
| $Bi_2O_3$: | 0.1 to 7 molar percent (excluding 7 molar percent), |
| $Na_2O$: | 0 to 30 molar percent, |
| $K_2O$: | 0 to 30 molar percent | where the combined content of $Li_2O$, $Na_2O$, and $K_2O$ is less than 40 molar percent,

| | |
|---|---|
| ZnO: | 0 to 35 molar percent, |
| CaO: | 0 to 35 molar percent, |
| BaO: | 0 to 50 molar percent, |
| $Nb_2O_5$: | 0 to 35 molar percent |
| $WO_3$: | 0 to 25 molar percent, | where the combined content of $Nb_2O_5$ and $WO_3$ exceeds 0 molar percent,
$SiO_2$: 0 to 5 weight percent (excluding 5 weight percent), where 0 to 1 weight percent of $Sb_2O_3$ is added to the total content of glass components; which has an Abbé number (vd) exceeding 32.

The sixth preform (referred to hereinafter as "Preform 6") is characterized by being comprised of an optical glass the components of which are:

| | |
|---|---|
| $P_2O_5$: | 15 to 70 molar percent, |
| $Bi_2O_3$: | 0.1 to 7 molar percent (excluding 7 molar percent), |
| $Li_2O$: | 10 to 40 molar percent (excluding 10 molar percent and 40 molar percent), |
| $Na_2O$: | 0 to 30 molar percent, |
| $K_2O$: | 0 to 30 molar percent, | where the combined content of $Li_2O$, $Na_2O$, and $K_2O$ is less than 40 molar percent,

| | |
|---|---|
| ZnO: | 0 to 35 molar percent, |
| CaO: | 0 to 35 molar percent, |
| BaO: | 0 to 50 molar percent, |
| $Nb_2O_5$: | 0 to 35 molar percent |
| $WO_3$: | 0 to 25 molar percent, |
| $SiO_2$: | 0 to 5 weight percent (excluding 5 weight percent), | where 0 to 1 weight percent of $Sb_2O_3$ is added to the total content of glass components; which has an Abbé number (vd) exceeding 32;

The seventh preform (referred to hereinafter as "Preform 7") is characterized by being comprised of an optical glass the components of which are:

| | |
|---|---|
| $P_2O_5$: | 15 to 70 molar percent, |
| $Bi_2O_3$: | 0.1 to 7 molar percent (excluding 7 molar percent), |
| $Na_2O$: | 0 to 30 molar percent, |
| $K_2O$: | 0 to 30 molar percent, | where the combined content of $Li_2O$, $Na_2O$, and $K_2O$ is less than 40 molar percent,

| | |
|---|---|
| ZnO: | 0 to 35 molar percent, |
| CaO: | 0 to 35 molar percent, |
| BaO: | 20 to 50 molar percent (excluding 20 molar percent), |
| $Nb_2O_5$: | 0 to 35 molar percent |
| $WO_3$: | 0 to 25 molar percent, |
| $SiO_2$: | 0 to 5 weight percent (excluding 5 weight percent), | where 0 to 1 weight percent of $Sb_2O_3$ is added to the total content of glass components; which has an Abbé number (vd) exceeding 32.

In each of Preforms 5 to 7, the optical glass desirably comprises more than 0 weight percent of $Nb_2O_5$, the weight ratio ($TiO_2$ content/$Bi_2O_3$ content) is desirably less than 0.5, and the weight ratio ($TiO_2$ content/$Nb_2O_5$ content) is desirably less than 0.1. The optical glass also desirably comprises 0 to 5 weight percent (excluding 5 weight percent) of $TiO_2$ and 0 to 30 weight percent (excluding 30 weight percent) of $Nb_2O_5$.

The reasons for the composition limits of the glasses from which Preforms 5 to 7 are formed will be given below.

$P_2O_5$ is a constituent component of the network structure of the glass, and is an essential component for imparting to the glass the stability required for manufacturing. To lower the glass transition temperature and sag point, increase weatherability, and enhance devitrification stability, the content of $P_2O_5$ is set within a range of 15 to 70 molar percent, preferably 17 to 67 molar percent.

$Bi_2O_3$ is an essential component that greatly increases the glass production range and imparts stability both when large and small $P_2O_5$ contents are employed. It is also a component that increases the weatherability of the glass. $Bi_2O_3$ increases the platinum wetting angle of the glass in a molten state, and helps prevent wetting when forming preforms for precision pressing by the dripping method or drop-cut method, described further below, where a glass melt is caused to flow out of a platinum or gold-containing platinum alloy pipe. Thus, it plays important roles in increasing the weight precision of the preform and suppressing surface striae. Thus, $Bi_2O_3$ is incorporated in a quantity of greater than or equal to 0.1 molar percent. However, when the content exceeds 7 molar percent, the glass ends to devitrify and discolor. Thus, the content is limited to 0.1 to 7 molar percent (excluding 7 molar percent), desirably 0.1 to 6 molar percent, and preferably 0.2 to 6 molar percent.

$Li_2O$, $Na_2O$, and $K_2O$ are components introduced to improve the resistance to devitrification of the glass, lower the glass transition temperature, lower the sag point, lower the liquid-phase temperature, and improve the high-temperature melt properties of the glass.

However, when $Na_2O$, and $K_2O$ are respectively contained in a quantity greater than 30 molar percent each, or when the combined quantity of $Li_2O$, $Na_2O$, and $K_2O$ exceeds 40 molar percent, the stability, weatherability, and durability of the glass tend to deteriorate. Thus, the content of $Na_2O$ is set to 0 to 30 molar percent, the content of $K_2O$ is set to 0 to 30 molar percent, and the combined quantity of $Li_2O$, $Na_2O$, and $K_2O$ is set to less than 40 molar percent.

The content of $Na_2O$ is desirably from 1 to 30 molar percent, preferably from 1 to 20 molar percent. In addition to falling within this range, the quantity is also desirably less than 5 weight percent.

The content of $K_2O$ is desirably 0 to 25 molar percent, preferably 0.1 to 10 molar percent.

The combined content of $Li_2O$, $Na_2O$, and $K_2O$ is desirably from 12 to 39 molar percent, preferably from 12 to 38 molar percent.

In Preform 6, the content of $Li_2O$ is 10 to 40 molar percent (excluding 10 molar percent and 40 molar percent), preferably 10.1 to 35 molar percent.

ZnO has the effect of lowering the glass transition temperature, sag point, and liquid-phase temperature when incorporated in small quantity. However, when incorporated in large quantity, there is a risk of sharp deterioration of the devitrification stability of the glass and an increased liquid-phase temperature. Accordingly, the ZnO content is set to 0 to 35 molar percent, desirably 1 to 20 molar percent, and preferably 2 to 20 molar percent.

CaO is an optional component that is incorporated to adjust glass stability and weatherability. When incorporated in excessive quantity, the glass becomes extremely unstable. Thus, the content is desirably set to 0 to 35 molar percent, preferably 0 to 10 molar percent, and more preferably 0 to 5 molar percent.

BaO is a component that effectively improves devitrification stability (resistance to devitrification) and lowers the liquid-phase temperature. When the $P_2O_5$ content is low, BaO has the effect of increasing the weatherability of the glass. However, when 50 molar percent is exceeded, the glass becomes unstable and the glass transition temperature and sag point rise. Thus, the BaO content is set to less than or equal to 50 molar percent.

In Preforms 5 and 6, the BaO content is set to 0 to 50 molar percent. In Preform 7, the BaO content is set to 20 to 50 molar percent (excluding 20 molar percent). In Preforms 5 and 6, the BaO content is desirably from 20 to 50 molar percent (excluding 20 molar percent). In Preforms 5 to 7, the BaO content is desirably from 20 to 40 molar percent (excluding 20 percent), and preferably from 20 to 30 molar percent (excluding 20 molar percent).

$Nb_2O_5$ is an optional component that can be incorporated to impart desired optical characteristics without employing PbO. However, when incorporated in excessive quantity, the glass transition temperature and sag point increase, stability deteriorates, and high-temperature melt properties deteriorate. Further, there is a problem in that the glass tends to foam and discolor during precision press molding. Thus, the content is set to 0 to 35 molar percent, desirably 0 to 15 molar percent, and preferably 0 to 10 molar percent. The quantity of $Nb_2O_5$ is desirably 0 to 30 weight percent (excluding 30 weight percent), preferably 0 to 20 weight percent, and more preferably 0 to 10 weight percent.

$WO_3$ is an optional component that can decrease the glass transition temperature without using PbO. $WO_3$ exhibits the same effect of reducing the glass transition temperature and sag point as alkali metal oxides, and also has the effect of inhibiting wetting of the pressing mold by the preform. Thus, it has the effect of improving the mold separation of the glass in precision press molding. However, when employed in excessive quantity, the preform tends to develop color and the high-temperature viscosity of the glass decreases, making it difficult to mold preforms for precision press molding. Thus, the content is set to 0 to 25 molar percent, desirably 0 to 10 molar percent, and preferably 0 to 7 molar percent.

In Preform 5, the combined quantity of $Nb_2O_5$ and $WO_3$ is set to greater than 0 to facilitate achieving desired optical constants and improve mold separation during precision press molding.

$SiO_2$ is an optional component that, in excessive quantity, raises the glass transition temperature and sag point. Thus, the content is set to 0 to 5 weight percent (excluding 5 weight percent). The content of $SiO_2$ is desirably 0 to 4 weight percent, preferably 0 to 2 weight percent, with no incorporation at all being even more preferred.

$B_2O_3$ is an optional component extremely effective at improving glass melt properties and homogeneity. When incorporated in small quantity, it changes the bonding property of the OH in the glass and is extremely effective at preventing foaming of the glass during precision press molding. However, when incorporated in a quantity greater than 10 molar percent, glass weatherability deteriorates and the glass becomes unstable. Thus, the content is desirably set to 0 to 10 molar percent, preferably 0 to 5 molar percent.

$Al_2O_3$, $La_2O_3$, $Gd_2O_3$, $Y_2O_3$, $ZrO_2$, and $Ta_2O_5$ are optional components that adjust glass stability and optical constants. Since all of these components raise the glass transition temperature, the content thereof is desirably kept to 0 to 15 molar percent of $Al_2O_3$, 0 to 10 molar percent of $La_2O_3$, 0 to 10 molar percent of $Gd_2O_3$, 0 to 10 molar percent of $Y_2O_3$, 0 to 10 molar percent of $ZrO_2$, and 0 to 10 molar percent of $Ta_2O_5$, with the quantity of $Al_2O_3$ preferably being 0 to 10 molar percent and the quantity of each of $La_2O_3$, $Gd_2O_3$, $Y_2O_3$, $ZrO_2$, and $Ta_2O_5$ preferably being 0 to 8 molar percent. The combined quantity of $Al_2O_3$, $La_2O_3$, $Gd_2O_3$, $Y_2O_3$, $ZrO_2$, and $Ta_2O_5$ is desirably kept to 0 to 6 molar percent (excluding 6 molar percent), preferably 0 to 5 molar percent (excluding 5 molar percent).

$TiO_2$ is an optional component that effectively increases glass dispersion properties and enhances devitrification stability. However, when incorporated in excessive quantity, glass devitrification stability and transmittance sharply deteriorate, the sag point and liquid-phase temperature rise sharply, and the glass tends to develop color during precision press molding. Thus, the quantity is desirably set to 0 to 5 weight percent (excluding 5 weight percent), preferably 0 to 4 weight percent (excluding 4 weight percent), more preferably 0 to 1 weight percent (excluding 1 weight percent), and still more preferably, none at all.

The weight ratio ($TiO_2$ content/$Bi_2O_3$ content) is desirably less than 0.5, preferably 0 to 0.45. When $Nb_2O_5$ is incorporated, the weight ratio ($TiO_2$ quantity/$Nb_2O_5$ quantity) is desirably less than 0.1, preferably 0 to 0.09. When $Nb_2O_5$ is not incorporated, $TiO_2$ is desirably not incorporated.

MgO and SrO are optional components incorporated to adjust the weatherability and stability of the glass. When incorporated in excessive quantity, the glass becomes extremely unstable. Thus, the content is desirably set to O to 10 molar percent each, preferably 0 to 8 molar percent each.

$Sb_2O_3$ is effective as a glass clarifying agent. However, when added in excessive quantity, the glass tends to foam during precision press molding. Thus, the quantity added is set to 0 to 1 weight percent of the combined quantity of all glass components. The desirable range of addition is 0 to 0.9 weight percent.

For the same reasons as for Preforms 1 to 4, Preforms 5 to 7 contain neither $Ag_2O$, $Tl_2O$, nor PbO, and the incorporation of $As_2O_3$, CdO, and the like is to be avoided. Further, to directly form preforms out of glass melt, the incorporation of volatile components is undesirable. Accordingly, the incorporation of fluorine is undesirable. Since $TeO_2$ is toxic and $GeO_2$ is expensive, these compounds are desirably not incorporated as starting materials.

In the glass used to mold Preforms 5 to 7, the desirable ranges of the various components given above can be combined as desired to achieve desirable composition ranges. Of these, the following are examples of desirable composition ranges.

Examples of desirable composition ranges of Preforms 5 to 7

In Preforms 5 to 7, desirable examples are:

(1) glass compositions where more than 0 weight percent of $Nb_2O_5$ is incorporated, the weight ratio ($TiO_2$ quantity/$Bi_2O_3$ quantity) is less than 0.5, and the weight ratio (TiO2 quantity/$Nb_2O_5$ quantity) is less than 0.1;

(2) glass compositions where 0 to 5 weight percent (excluding 5 weight percent) of $TiO_2$ and 0 to 30 weight percent (excluding 30 weight percent) of $Nb_2O_5$ are incorporated;

(3) compositions where the glass components are:

| | |
|---|---|
| $P_2O_5$: | 17 to 67 molar percent, |
| $Bi_2O_3$: | 0.2 to 6 molar percent, |
| $Na_2O$: | 1 to 20 molar percent, |
| $K_2O$: | 0.1 to 10 molar percent, | where the combined quantity of $Li_2O$, $Na_2O$, and $K_2O$ is 12 to 38 molar percent,

| | |
|---|---|
| ZnO: | 2 to 20 molar percent, |
| CaO: | 0 to 5 molar percent, |
| BaO: | 20 to 50 molar percent (excluding 20 molar percent), |
| $Nb_2O_5$: | 0 to 10 molar percent (0 to 10 weight percent), |
| $WO_3$: | 0 to 7 molar percent, |
| $SiO_2$: | 0 to 4 weight percent, |
| $B_2O_3$: | 0 to 5 molar percent, |
| $TiO_2$: | 0 to 5 weight percent (excluding 5 molar percent), | where the weight ratio of ($TiO_2$ content/$Bi_2O_3$ content) is less 0 to 0.45 and $Sb_2O_3$ is added in a quantity of 0 to 0.9 weight percent of the combined content of all glass components;

(4) compositions where the glass components are:

| | |
|---|---|
| $P_2O_5$: | 17 to 67 molar percent, |
| $Bi_2O_3$: | 0.2 to 6 molar percent, |
| $Na_2O$: | 1 to 20 molar percent, |
| $K_2O$: | 0.1 to 10 molar percent, | where the combined quantity of $Li_2O$, $Na_2O$, and $K_2O$ is 12 to 38 molar percent,

| | |
|---|---|
| ZnO: | 2 to 20 molar percent, |
| CaO: | 0 to 5 molar percent, |
| BaO: | 20 to 40 molar percent (excluding 20 molar percent), |
| $Nb_2O_5$: | 0 to 10 molar percent (0 to 10 weight percent), |
| $WO_3$: | 0 to 7 molar percent, |
| $SiO_2$: | 0 to 2 weight percent, |
| $B_2O_3$: | 0 to 5 molar percent, |
| $TiO_2$: | 0 to 4 weight percent (excluding 4 weight percent), | where the weight ratio of ($TiO_2$ content/$Bi_2O_3$ content) is less 0 to 0.45 and $Sb_2O_3$ is added in a quantity of O to 0.9 weight percent of the combined content of all glass components;
(5) glass compositions where 0 to 1 weight percent (excluding 1 weight percent) of $TiO_2$ is incorporated;
(6) glass compositions where no $TiO_2$ is incorporated;
(7) glass compositions where 0 to 2 weight percent (excluding 2 weight percent) of $SiO_2$ is incorporated;
(8) glass compositions where no $SiO_2$ is incorporated;
(9) glass compositions where $Nb_2O_5$ is incorporated and the weight ratio of ($TiO_2$ quantity/$Nb_2O_5$ quantity) is 0 to 0.09;
(10) glass compositions where the combined contents of $P_2O_5$, $Bi_2O_3$, $Li_2O$, $Na_2O$, $K_2O$, ZnO, CaO, BaO, $Nb_2O_5$, $WO_3$, $B_2O_3$, $Gd_2O_3$, and $Y_2O_3$ exceed 95 molar percent and $Sb_2O_3$ is added in a quantity of 0 to 0.09 weight percent of the combined contents of all the glass components;
(11) glass compositions where the combined contents of $P_2O_5$, $Bi_2O_3$, $Li_2O$, $Na_2O$, $K_2O$, ZnO, CaO, BaO, $Nb_2O_5$, $WO_3$, $B_2O_3$, $Gd_2O_3$, and $Y_2O_3$ exceed 98 molar percent and $Sb_2O_3$ is added in a quantity of 0 to 0.09 weight percent of the combined contents of all the glass components;
(12) glass compositions where the combined contents of $P_2O_5$, $Bi_2O_3$, $Li_2O$, $Na_2O$, $K_2O$, ZnO, CaO, BaO, $Nb_2O_5$, $WO_3$, $B_2O_3$, $Gd_2O_3$, and $Y_2O_3$ exceed 99 molar percent and $Sb_2O_3$ is added in a quantity of 0 to 0.09 weight percent of the combined contents of all the glass components; and
(13) glass compositions where the combined contents of $P_2O_5$, $Bi_2O_3$, $Li_2O$, $Na_2O$, $K_2O$, ZnO, CaO, BaO, $Nb_2O_5$, $WO_3$, $B_2O_3$, $Gd_2O_3$, and $Y_2O_3$ comprise 100 molar percent and $Sb_2O_3$ is added in a quantity of 0 to 0.09 weight percent of the combined contents of all the glass components;

In Preforms 5 to 7, a refractive index (nd) of 1.45 to 2.0 and an Abbé number (vd) exceeding 32 and less than 95 are desirable to achieve high glass stability, a low glass transition temperature, and little coloration. The glass composition can be adjusted within the ranges specified in the claims to obtain glass preforms that have a refractive index (nd) of 1.45 to 2.0 and Abbé number (vd) falling within the above-stated ranges and achieve glass stability, a low glass transition temperature, and low coloration.

To lower the temperature of the pressing mold in precision press molding, the glass transition temperature (Tg) is desirably kept to less than or equal to 600° C., preferably less than or equal to 550° C., and more preferably less than or equal to 500° C. The sag point (Ts) is desirably kept to less than or equal to 650° C., preferably less than or equal to 600° C., and more preferably to less than or equal to 550° C.

The ranges of greatest preference are a glass transition temperature (Tg) of less than or equal to 360° C. and a sag point (Ts) of less than or equal to 400° C.

To mold high-quality preforms from glass melt, the liquid-phase temperature of the glass is desirably less than 1,000° C., preferably less than 900° C., more preferably less than 850° C., and still more preferably less than 800° C. Glasses having glass compositions falling within the ranges specified in the claims basically have a liquid-phase temperature (LT) falling within the above-stated range. The glass composition can be adjusted within the ranges specified in the claims to obtain glass preforms having a liquid-phase temperature (LT) falling within the above range.

In Preforms 5 to 7, the desirable specific gravity range is from 2.9 to 3.8. The haze value is desirably less than or equal to 10 percent, preferably less than or equal to 8.5 percent, and more preferably less than or equal to 3 percent. The mass loss rate (Dw) when immersed in pure water (100° C.) is desirably less than 0.3 weight percent, preferably less than or equal to 0.25 weight percent. The average coefficient of linear expansion ($\alpha$) is desirably 140 to 200×$10^{-7}$/° C.

Glasses having glass compositions falling within the ranges specified in the claims basically have a specific gravity, haze value, mass loss rate (Dw) when immersed in pure water, and average coefficient of linear expansion ($\alpha$) falling within the above-stated ranges. The glass composition can be adjusted within the ranges specified in the claims to obtain glass preforms having a specific gravity, haze value, mass loss rate (Dw) when immersed in pure water, and average coefficient of linear expansion ($\alpha$) falling within the above-stated ranges.

The method of measuring the various physical properties are described in the embodiments.

The eighth preform (referred to hereinbelow as "Preform 8") is characterized by being comprised of optical glass containing essential components in the form of 15 to 70 molar percent of $P_2O_5$ and $Bi_2O_3$ as well as a quantity of $TiO_2$ of less than 0.5 times the content of $Bi_2O_3$ by weight, and 0 to 5 weight percent (excluding 5 weight percent) of $SiO_2$, and characterized in that glass, the entire surface of which is molten, is solidified and molded.

Preform 8 can be divided into Preforms 8-1 to 8-4.

Preform 8-1 is Preform 8 in which the optical glass has an Abbé number (vd) of less than or equal to 32 and comprises more than 4 weight percent and less than or equal to 30 molar percent, desirably greater than or equal to 4.5 weight percent and less than or equal to 30 molar percent, and preferably greater than or equal to 5 weight percent and less than or equal to 30 molar percent of $Bi_2O_3$.

Preform 8-2 is Preform 8 with an Abbé number (vd) of less than or equal to 32 containing $B_2O_3$ as an essential component.

Preform 8-3 is Preform 8 with an Abbé number (vd) of less than or equal to 32 containing $WO_3$ in a quantity of 0 to 15 weight percent (excluding 15 weight percent), desirably less than or equal to 14.5 weight percent, and preferably less than or equal to 14 weight percent.

Preform 8-4 is Preform 8 with an Abbé number (vd) exceeding 32, preferably greater than or equal to 32.1.

The ninth preform (referred to as "Preform 9" hereinafter) is characterized by being comprised of optical glass containing 15 to 70 molar percent of $P_2O_5$ and $Bi_2O_3$ as essential components, less than 0.5 times the content of $Bi_2O_3$ by weight of $TiO_2$, and from 0 to 5 weight percent (excluding 5 weight percent) of SiO2, with the entire surface being a free surface.

Preform 9 can be divided into Preforms 9-1 to 9-4.

Preform 9-1 is Preform 9 with an Abbé number (vd) of less than or equal to 32 comprising $Bi_2O_3$ in a quantity of greater than 4 weight percent and less than or equal to 30 molar percent, desirably greater than or equal to 4.5 weight percent and less than or equal to 30molar percent, and preferably greater than or equal to 5 molar percent and less than or equal to 30 molar percent.

Preform 9-2 is Preform 9 with an Abbé number (vd) of less than or equal to 32 containing $B_2O_3$ as an essential component.

Preform 9-3 is Preform 9 with an Abbé number (vd) of less than or equal to 32 comprising $WO_3$ in a quantity of 0 to 15 weight percent (excluding 15 weight percent), desirably less than or equal to 14.5 weight percent, and preferably less than or equal to 14 weight percent.

Preform 9-4 is Preform 9 with an Abbé number (vd) exceeding 32, preferably greater than or equal to 32.5.

Preforms consisting of any combination of limits falling within the composition ranges of any of the forms of Preforms 1-1 to 1-4, 2-1 to 2-4, 3-1 to 3-4, 4-1 to 4-4, 8-1 to 8-3, and 9-1 to 9-3 are also possible in the present invention.

Preforms consisting of any combination of limits falling within the composition ranges of any of the forms of Preforms 5-1 to 5-4, 6-1 to 6-4, 7-1 to 7-4, 8-4, and 9-4 are also possible in the present invention.

In Preforms 8 and 9, $P_2O_5$ is a constituent component of the network structure of the glass that is essential to imparting stability permitting manufacturing to the glass. From the perspectives of lowering the glass transition temperature and sag point, enhancing weatherability, and increasing devitrification stability, the content of $P_2O_5$ is set to 15 to 70 molar percent, preferably 17 to 67 molar percent.

$Bi_2O_3$ is an essential component that greatly broadens the glass production range, has a stabilizing effect, and increases the weatherability of the glass. It is also a component that increases the weatherability of the glass. $Bi_2O_3$ increases the wetting angle of platinum and platinum alloys by the glass in a molten state, and enhances the suppression of wetting when forming preforms for precision pressing by the drip method or drop-cut method, described further below, where a glass melt is caused to flow out of a platinum or gold-containing platinum alloy pipe. Thus, it plays important roles in increasing the weight precision of the preform and suppressing surface striae. $TiO_2$ is an optional component improving the dispersion of the glass and enhancing devitrification stability. Setting the glass composition so that content of $Bi_2O_3$ and $TiO_2$ relative to $P_2O_5$ yields a weight ratio ($TiO_2$ content/$Bi_2O_3$ content) of less than 0.5 permits the providing of a preform suited to precision press molding the surface of which is formed by solidifying glass the entire surface of which is in a molten state or the entire surface of which is a free surface, free of devitrification, striae, and the like. That is, to obtain a structure in the form of a surface formed by solidification of glass the entire surface of which is in a molten state or a structure where the entire surface is a free surface, a glass melt gob equivalent to one preform must be separated from a glass melt and molded into a preform while within a temperature range permitting plastic deformation. It is also necessary to apply wind pressure to the glass melt gob (including both glass melt gobs and glass gobs in the form of glass melt gobs being cooled) and mold the glass gob as it is being floated. $Bi_2O_3$ and $TiO_2$ increase the refractive index. Between $Bi_2O_3$ and $TiO_2$, $Bi_2O_3$ has the better glass stabilizing effect, better wetting preventive effect, and better striae reducing effect. Thus, since a prescribed relation of the weight ratio ($TiO_2$ content/$Bi_2O_3$ content) exists in the above preform, these effects can be achieved while obtaining prescribed optical characteristics, and a higher quality preform can be provided. The weight ratio ($TiO_2$ content/$Bi_2O_3$ content) is desirably 0 to 0.09. In Preforms 8-1 and 9-2, the above-stated quantity of $Bi_2O_3$ is incorporated. The phrase "a surface formed by solidifying glass the entire surface of which is in a molten state" refers to the surface of a glass gob, that is, preform, that has been formed without mechanically processing following cooling and solidification of the glass gob while in a molten state.

$SiO_2$ is an optional component. When introduced in excessive quantity, the glass transition temperature and sag point rise. Thus, the content is set to 0 to 5 weight percent (excluding 5 weight percent), desirably 0 to 4 weight percent, preferably 0 to 2 weight percent, and more preferably, none at all.

In Preforms 8-2 and 9-2, $B_2O_3$ is incorporated as an essential component for the same reasons as in Preforms 1-2, 2-2, 3-2, and 4-2. In Preforms 8-3 and 9-3, $WO_3$ is incorporated in a prescribed quantity for the same reasons as in Preforms 1-3, 2-3, 3-3, and 4-3.

The limits of the composition ranges of forms 8-1 to 8-3 of Preform 8 above may be combined as desired to obtain the preform of the present invention. Similarly, the limits of the composition ranges of forms 9-1 to 9-3 of Preform 9 above may be combined as desired to obtain the preform of the present invention.

Further, in Preforms 8 and 9, the optical glass desirably contains 3 to 15 weight percent (excluding 3 weight percent) of $Li_2O$. The reason for this and the quantity incorporated are identical to those in Preforms 1 to 4.

In Preforms 8 and 9, the optical glass desirably contains BaO as an optional component. In particular, when the Abbé number (vd) is less than or equal to 32, the quantity of BaO is desirably 0 to 15 molar percent, and when the Abbé number (vd) exceeds 32, the quantity of BaO is desirably 0 to 50 molar percent.

For the same reasons as in Preforms 1 to 7, $Ag_2O$, $Tl_2O$, and PbO are excluded from the glass. $As_2O_3$, F, CdO, $TeO_2$, and $GeO_2$ are also desirably not incorporated for the same reasons as in Preforms 1 to 7.

Preforms 8 and 9 desirably comprise glass to which $Sb_2O_3$ is added in a quantity of from 0 to 1 weight percent (excluding 1 weight percent), preferably 0 to 0.9 weight percent, of the combined quantity of all glass components. In this glass, the glass transition temperature (Tg) is also desirably less than or equal to 600° C. and the sag point (Ts) desirably less than or equal to 650° C. The liquid-phase temperature (LT) is also desirably less than or equal to 1,000° C.

Preforms for precision press molding desirably have free surfaces formed by solidification of glass the entire surface of which is in a molten state.

Specifically, in Preforms 1 to 7, it is desirable for the surface of the preform to be a surface formed by solidifying glass the entire surface of which is in a molten state, for the entire surface of the preform to be a free surface, or for the surface of the preform to be a free surface formed by solidifying glass the entire surface of which is in a molten state. In Preform 8, it is desirable for the entire surface to be a free surface.

The phrase "a surface formed by solidifying glass the entire surface of which is in a molten state" allows for spots where a metal mold surface is transferred by contact with a metal mold for molding, while the phrase "entire surface . . . to be a free surface" excludes the presence of spots where a metal mold surface has been transferred by contact with a metal mold for molding.

Imparting such a surface to the preform prevents even minute polishing scratches, yielding a smooth, clean surface and permitting the manufacturing of better optical elements by precision press molding of preforms.

The method of manufacturing preforms for precision press molding will be described next.

As starting materials for optical glass, $H_3PO_4$, metaphosphate, diphosphorus pentachloride, and the like may be employed for $P_2O_5$; $H_3BO_3$, $B_2O_3$, and the like may be employed for $B_2O_3$; and carbonates, nitrates, and oxides may be suitably employed for the other components. These starting materials are weighed out in prescribed proportions and mixed to obtain a blended starting material. This is then heated to 1,000 to 1,250° C. and placed in a melting furnace, melted, clarified, stirred, and homogenized to obtain an optical glass melt free of bubbles.

The glass melt thus prepared is made to flow out of a flow pipe, a prescribed weight of glass melt is separated from the glass melt flowing out of the flow pipe, and one of Preforms 1 to 9 with the same weight as above is molded before solidifying the glass melt gob. That is, while the glass melt gob is still soft and moldable and is not in contact with any solid, it is molded into a desired shape.

The glass melt is caused to flow out of the melt pipe at a temperature equivalent to a viscosity of 3 to 60 dPa·s. Here, the term "flow out" refers both to the case where a glass melt flow flows out of the flow pipe and the case where the glass melt drips out of the flow pipe. The temperature of the flow pipe is adjusted, for example, by controlling the temperature of the flow pipe. The flow pipe is desirably made of platinum or a platinum alloy. Specific molding methods include causing glass melt to flow out of the flow pipe as a glass melt drop of prescribed weight, receiving the drop in a receiving member, and molding it into a preform; the method of similarly causing a glass melt drop of prescribed weight to drip out of the flow pipe into liquid nitrogen or the like, and molding it into a preform (referred to as "drip methods"); causing a glass melt flow to drip from a flow pipe of platinum or a platinum alloy, receiving the front end of the glass melt flow on a receiving member, forming a constriction in the glass melt flow between the flow pipe and the receiving member, and then separating the glass melt flow at the constriction to receive a gob of glass melt of prescribed weight in the receiving member, and molding this into a preform (referred to as the "drop-cut" method). When dripping a glass melt, the viscosity of the glass is desirably 3 to 30 dPa·s. When causing the glass melt to flow as a glass melt flow, the viscosity of the glass is desirably 2 to 60 dPa·s.

Any of Preforms 1 to 7 having a smooth surface without scratches, contamination, or surface anomalies, or having a surface formed by solidification of glass the entire surface of which is in a molten state, and any of Preforms 1 to 7 the entire surface of which is a free surface, may be produced by molding a glass melt gob while floating it by wind pressure on a pressing mold, or by introducing a glass melt drop into a medium in the form of a liquid obtained by cooling a gas substance at ordinary temperature and pressure, such as liquid nitrogen, and molding it into a preform.

Examples of preform shapes are the preform shapes given above.

A carbon-containing film or the like may be provided on the surface of the preform of the present invention. This film is desirably provided over the entire surface of the preform. This film facilitates separation of the precision press-molded article from the mold and facilitates good extension of the glass at the surface contacting the pressing mold during precision press molding. Examples of carbon-containing films are carbon films formed by vapor deposition, hydrogenated carbon films formed by chemical vapor deposition, and the like.

The optical element of the present invention will be described next.

The optical element of the present invention is obtained by precision press molding any of Preforms 1 to 9 or a preform manufactured by one of the above-described manufacturing methods. The optical element obtained has the various optical characteristics of the preform. The optical element is made of glass. As needed, an antireflective film, reflective film, partially reflective film reflecting certain wavelengths of light, film absorbing certain wavelengths of light, or the like can be provided on the surface. Specific examples of the optical element are spherical lenses, aspherical lenses, microlenses, lens arrays, lenses with diffraction gratings, various other lenses, diffraction gratings, prisms, prisms with lenses, and polygonal mirrors. These optical elements are precision press-molded articles molded from the above-described preforms. Thus, the optically functional surfaces thereof are free of microscratches and the like produced by processing such as grinding and polishing. Since they are comprised of glass not containing PbO, they are extremely good optical elements from the perspectives of the environment and cost.

The method of manufacturing optical elements of the present invention will be described next. In the method of manufacturing optical elements of the present invention, any of the Preforms of 1 to 9 or a preform manufactured by one of the above-described methods is heated and then precision press molded in a pressing mold to manufacturing an optical element.

In precision press molding, a pressing mold with a molding surface that has been processed with high precision into a desired shape in advance is employed. To prevent adhesion of the glass during pressing, a mold separation film may be formed on the molding surface. To prevent damage due to oxidization of the molding surface of the pressing mold, precision press molding may be conducted in a non-oxidizing gas atmosphere, such as nitrogen, employing known methods.

Examples of the method of manufacturing optical elements of the present invention are the method of introducing a preform for precision press molding into a pressing mold, heating both the pressing mold and the preform, and conducting precision press molding; and the method of introducing a preform for precision press molding that has been preheated to a temperature greater than that of the pressing mold into the pressing mold and conducting precision press molding.

The precision press molding conditions can be suitably set based on known ranges of the shape and size of precision press-molded articles.

It is thus possible to manufacture optical articles such as spherical lenses, aspherical lenses, microlenses, lens arrays, lenses with diffraction gratings, various other lenses, diffraction gratings, prisms, prisms with lenses, and polygonal mirrors with optically functional surfaces that are not mechanically processed.

EMBODIMENTS

The present invention is further described below through embodiments.

The embodiments and Preforms 1 to 9 are related as follows.

Embodiments 1 to 9: Preforms 3, 4, 8, 9
Embodiments 10 to 12: Preforms 1-4, 8, 9
Embodiments 13 to 17: Preforms 3, 4, 8, 9
Embodiments 18 to 21, 26, 28: Preforms 5 to 9
Embodiments 22 to 25, 27: Preforms 6 to 9
Embodiment 29: Preform 6, 8, 9

Embodiments 1 to 29

Table 1 gives the composition, refractive index (nd), Abbé number (vd), glass transition temperature (Tg), sag point (Ts), and liquid-phase temperature (LT) of the glasses used to make the preforms of Embodiments 1 to 17. Table 2 gives the composition, refractive index (nd), Abbé number (vd), glass transition temperature (Tg), sag point (Ts), and liquid-phase temperature (LT) of the glasses used to make the preforms of Embodiments 18 to 39. In these glasses, corresponding oxides, hydroxides, carbonates, and nitrates were employed as starting materials for the various components. They were weighed out and blended so as to yield the proportions of the composition given in Table 1 following vitrification, thoroughly mixed, placed in a platinum crucible, melted at a temperature range of from 1,050 to 1,200° C. in an electric furnace, clarified, and homogenized by stirring to obtain a glass melt. This glass melt was cast into a preheated metal mold, cooled to the glass transition temperature, immediately annealed, and gradually cooled to room temperature.

The various characteristics of the optical glasses obtained were measured. The refractive index (nd), Abbé number (vd), liquid-phase temperature (LT), glass transition temperature (Tg), sag point (Ts), $\lambda 80$, $\lambda 5$, specific gravity, and average modulus of linear expansion ($\alpha$) were measured in Embodiments 1 to 17 as follows. The refractive index (nd), Abbé number (vd), liquid-phase temperature (LT), glass transition temperature (Tg), sag point (Ts), specific gravity, haze value, mass loss rate (Dw) when immersed in pure water, and average modulus of linear expansion ($\alpha$) were measured in Embodiments 18 to 29 as follows.

(1) The Refractive Index (nd) and Abbé Number (vd):
Measured for optical glasses obtained at a gradual temperature reduction rate of −30° C./hour.

(2) The Liquid-Phase Temperature (LT)
The sample was placed for 1 hour in a devitrification test furnace with a temperature gradient of from 400 to 1,150° C., the presence of crystals was checked with a microscope at 80-fold magnification, and the liquid-phase temperature was measured.

(3) Glass Transition Temperature (Tg) and Sag Point (Ts)
Measured at a heating rate of 4° C./min with a thermomechanical analyzer made by Rigaku Denki K. K.

(4) $\lambda 80$, $\lambda 5$
The spectral transmittance was measured at wavelengths of 280 to 700 nm for a sample 10.0±0.1 mm in thickness and the values were calculated.

(4) Specific Gravity
Measured by Archimedes' method.

(5) Haze Value
Measured based on the standard, "Method of measuring the chemical durability of optical glass (surface method) 07" of the Japan Optical Glass Industrial Association.

(6) Mass Loss Rate (Dw) when Immersed in Pure Water
Measured based on the standard, "Method of measuring the chemical durability of optical glass (surface method) 06" of the Japan Optical Glass Industrial Association.

(7) Average Coefficient of Linear Expansion ($\alpha$)
The average coefficient of linear expansion was measured at 100 to 300° C.

TABLE 1

| Embodiment | | $P_2O_5$ | $TiO_2$ | $Bi_2O_3$ | $TiO_2/Bi_2O_3$ | $B_2O_3$ | $Nb_2O_5$ | $TiO_2/Nb_2O_5$ | $WO_3$ | ZnO |
|---|---|---|---|---|---|---|---|---|---|---|
| 1 | Molar % | 24.00 | 5.00 | 2.00 | 2.50 | 4.00 | 19.00 | 0.26 | 8.00 | 2.00 |
|   | wt % | 24.31 | 2.85 | 6.65 | 0.43 | 1.99 | 36.04 | 0.08 | 13.24 | 1.16 |
| 2 | Molar % | 23.00 | 5.00 | 6.00 | 0.83 | 4.00 | 19.00 | 0.26 | 8.00 | 2.00 |
|   | wt % | 21.28 | 2.60 | 18.23 | 0.14 | 1.82 | 32.93 | 0.08 | 12.09 | 1.06 |
| 3 | Molar % | 23.00 | 5.00 | 4.00 | 1.25 | 4.00 | 19.00 | 0.26 | 8.00 | 2.00 |
|   | wt % | 22.47 | 2.75 | 12.83 | 0.21 | 1.92 | 34.76 | 0.08 | 12.77 | 1.12 |
| 4 | Molar % | 23.00 | 5.00 | 5.00 | 1.00 | 4.00 | 18.00 | 0.28 | 5.00 | 2.00 |
|   | wt % | 22.77 | 2.79 | 16.25 | 0.17 | 1.94 | 33.37 | 0.08 | 8.08 | 1.14 |
| 5 | Molar % | 24.00 | 5.00 | 6.00 | 0.83 | 4.00 | 18.00 | 0.28 | 6.00 | 2.00 |
|   | wt % | 22.90 | 2.69 | 18.80 | 0.14 | 1.87 | 32.17 | 0.08 | 9.35 | 1.09 |
| 6 | Molar % | 24.00 | 6.00 | 4.00 | 1.50 | 4.00 | 18.00 | 0.33 | 5.00 | 2.00 |
|   | wt % | 24.28 | 3.42 | 13.28 | 0.26 | 1.98 | 34.09 | 0.10 | 8.26 | 1.16 |
| 7 | Molar % | 24.00 | 5.00 | 4.00 | 1.25 | 4.00 | 19.00 | 0.26 | 5.00 | 2.00 |
|   | wt % | 23.96 | 2.81 | 13.11 | 0.21 | 1.96 | 35.52 | 0.08 | 8.15 | 1.14 |
| 8 | Molar % | 26.00 | 5.00 | 4.00 | 1.25 | 4.00 | 19.00 | 0.26 | 5.00 | 1.00 |
|   | wt % | 25.86 | 2.80 | 13.06 | 0.21 | 1.95 | 35.40 | 0.08 | 8.12 | 0.57 |
| 9 | Molar % | 27.00 | 5.00 | 4.00 | 1.25 | 4.00 | 19.00 | 0.26 | 5.00 | 0.00 |
|   | wt % | 26.75 | 2.79 | 13.01 | 0.21 | 1.94 | 35.25 | 0.08 | 8.09 | 0.00 |
| 10 | Molar % | 24.00 | 6.00 | 8.00 | 0.75 | 4.00 | 19.00 | 0.32 | 6.00 | 0.00 |
|   | wt % | 21.23 | 2.99 | 23.23 | 0.13 | 1.74 | 31.47 | 0.10 | 8.67 | 0.00 |
| 11 | Molar % | 24.00 | 5.00 | 8.00 | 0.63 | 4.00 | 20.00 | 0.25 | 6.00 | 0.00 |
|   | wt % | 21.22 | 2.49 | 23.22 | 0.11 | 1.73 | 33.12 | 0.08 | 8.67 | 0.00 |
| 12 | Molar % | 24.00 | 6.00 | 9.00 | 0.67 | 4.00 | 18.00 | 0.33 | 6.00 | 0.00 |
|   | wt % | 21.20 | 2.98 | 26.10 | 0.11 | 1.73 | 29.78 | 0.10 | 8.66 | 0.00 |
| 13 | Molar % | 25.00 | 5.00 | 4.00 | 1.25 | 4.00 | 19.00 | 0.26 | 6.00 | 1.00 |
|   | wt % | 24.77 | 2.79 | 13.01 | 0.21 | 1.94 | 35.25 | 0.08 | 9.71 | 0.57 |
| 14 | Molar % | 24.00 | 5.00 | 3.00 | 1.67 | 6.00 | 18.00 | 0.28 | 5.00 | 2.00 |
|   | wt % | 25.00 | 2.93 | 10.26 | 0.29 | 3.07 | 35.11 | 0.08 | 8.51 | 1.19 |
| 15 | Molar % | 25.00 | 5.00 | 3.00 | 1.67 | 5.00 | 18.00 | 0.28 | 5.00 | 2.00 |
|   | wt % | 25.90 | 2.92 | 10.20 | 0.29 | 2.54 | 34.93 | 0.08 | 8.46 | 1.19 |
| 16 | Molar % | 24.00 | 5.50 | 4.00 | 1.38 | 6.00 | 19.00 | 0.29 | 5.00 | 1.00 |
|   | wt % | 24.13 | 3.11 | 13.20 | 0.24 | 2.96 | 35.78 | 0.09 | 8.21 | 0.58 |
| 17 | Molar % | 25.00 | 5.50 | 4.00 | 1.38 | 4.00 | 19.00 | 0.29 | 5.00 | 1.50 |
|   | wt % | 25.03 | 3.10 | 13.15 | 0.24 | 1.96 | 35.63 | 0.09 | 8.18 | 0.86 |

TABLE 1-continued

| Embodiment | | Li$_2$O | Na$_2$O | K$_2$O | R$_2$O(*) | Na$_2$O + K$_2$O | BaO | CaO | SiO$_2$ | Sum |
|---|---|---|---|---|---|---|---|---|---|---|
| 1 | Molar % | 20.00 | 11.00 | 2.00 | 33.00 | 13.00 | 3.00 | 0.00 | 0.00 | 100.00 |
|   | wt % | 4.26 | 4.87 | 1.34 | 10.47 | 6.21 | 3.28 | 0.00 | 0.00 | 100.00 |
| 2 | Molar % | 18.00 | 13.00 | 2.00 | 33.00 | 115.00 | 0.00 | 0.00 | 0.00 | 100.00 |
|   | wt % | 3.51 | 5.25 | 1.23 | 9.99 | 6.48 | 0.00 | 0.00 | 0.00 | 100.00 |
| 3 | Molar % | 18.00 | 15.00 | 2.00 | 35.00 | 17.00 | 0.00 | 0.00 | 0.00 | 100.00 |
|   | wt % | 3.70 | 6.40 | 1.30 | 11.40 | 7.70 | 0.00 | 0.00 | 0.00 | 100.00 |
| 4 | Molar % | 18.00 | 18.00 | 0.00 | 36.00 | 18.00 | 2.00 | 0.00 | 0.00 | 100.00 |
|   | wt % | 3.75 | 7.78 | 0.00 | 11.53 | 7.78 | 2.14 | 0.00 | 0.00 | 100.00 |
| 5 | Molar % | 18.00 | 15.00 | 2.00 | 35.00 | 17.00 | 0.00 | 0.00 | 0.00 | 100.00 |
|   | wt % | 3.62 | 6.25 | 1.27 | 11.14 | 7.52 | 0.00 | 0.00 | 0.00 | 100.00 |
| 6 | Molar % | 20.00 | 13.00 | 2.00 | 35.00 | 15.00 | 2.00 | 0.00 | 0.00 | 100.00 |
|   | wt % | 4.26 | 5.74 | 1.34 | 11.34 | 7.08 | 2.19 | 0.00 | 0.00 | 100.00 |
| 7 | Molar % | 20.00 | 13.00 | 2.00 | 35.00 | 15.00 | 2.00 | 0.00 | 0.00 | 100.00 |
|   | wt % | 4.20 | 5.67 | 1.32 | 11.19 | 6.99 | 2.16 | 0.00 | 0.00 | 100.00 |
| 8 | Molar % | 20.00 | 13.00 | 2.00 | 35.00 | 15.00 | 1.00 | 0.00 | 0.00 | 100.00 |
|   | wt % | 4.19 | 5.65 | 1.32 | 11.16 | 6.97 | 1.07 | 0.00 | 0.00 | 100.00 |
| 9 | Molar % | 20.00 | 13.00 | 2.00 | 35.00 | 15.00 | 1.00 | 0.00 | 0.00 | 100.00 |
|   | wt % | 4.17 | 5.62 | 1.31 | 11.10 | 6.93 | 1.07 | 0.00 | 0.00 | 100.00 |
| 10 | Molar % | 18.00 | 11.00 | 2.00 | 31.00 | 13.00 | 2.00 | 0.00 | 0.00 | 100.00 |
|    | wt % | 3.35 | 4.25 | 1.17 | 8.77 | 5.42 | 1.91 | 0.00 | 0.00 | 100.00 |
| 11 | Molar % | 18.00 | 13.00 | 2.00 | 33.00 | 15.00 | 0.00 | 0.00 | 0.00 | 100.00 |
|    | wt % | 3.35 | 5.02 | 1.17 | 9.54 | 6.19 | 0.00 | 0.00 | 0.00 | 100.00 |
| 12 | Molar % | 18.00 | 13.00 | 2.00 | 33.00 | 15.00 | 0.00 | 0.00 | 0.00 | 100.00 |
|    | wwt % | 3.35 | 5.02 | 1.17 | 9.54 | 6.19 | 0.00 | 0.00 | 0.00 | 100.00 |
| 13 | Molar % | 21.00 | 12.00 | 2.00 | 35.00 | 14.00 | 1.00 | 0.00 | 0.00 | 100.00 |
|    | wt % | 4.38 | 5.19 | 1.32 | 10.89 | 6.51 | 1.07 | 0.00 | 0.00 | 100.00 |
| 14 | Molar % | 20.00 | 13.00 | 2.00 | 35.00 | 15.00 | 2.00 | 0.00 | 0.00 | 100.00 |
|    | wt % | 4.39 | 5.91 | 1.38 | 11.68 | 7.29 | 2.25 | 0.00 | 0.00 | 100.00 |
| 15 | Molar % | 20.00 | 113.00 | 2.00 | 35.00 | 15.00 | 2.00 | 0.00 | 0.00 | 100.00 |
|    | wt % | 4.36 | 5.88 | 1.38 | 11.62 | 7.26 | 2.24 | 0.00 | 0.00 | 100.00 |
| 16 | Molar % | 20.50 | 12.00 | 2.00 | 34.50 | 14.00 | 1.00 | 0.00 | 0.00 | 100.00 |
|    | wt % | 4.34 | 5.27 | 1.33 | 10.94 | 6.60 | 1.09 | 0.00 | 0.00 | 100.00 |
| 17 | Molar % | 21.00 | 12.00 | 2.00 | 35.00 | 14.00 | 1.00 | 0.00 | 0.00 | 100.00 |
|    | wt % | 4.43 | 5.25 | 1.33 | 11.01 | 6.58 | 1.08 | 0.00 | 0.00 | 100.00 |

| Embodiment | nd | νd | LT (°C.) | Tg (°C.) | Ts (°C.) | λ80 (nm) | λ5 (nm) | Specific Gravity | α (× 10$^{-7}$/° C.) |
|---|---|---|---|---|---|---|---|---|---|
| 1 | 1.84541 | 23.15 | 920≧ | 466 | 519 | 506 | 378 | 3.803 | 113.0 |
| 2 | 1.88863 | 21.73 | 920≧ | 448 | 497 | 543 | 386 | 4.086 | 115.0 |
| 3 | 1.86137 | 22.37 | 920≧ | 453 | 504 | 515 | 381 | 3.913 | 119.0 |
| 4 | 1.85136 | 21.86 | 920≧ | 443 | 492 | 517 | 381 | 3.938 | 127.0 |
| 5 | 1.86026 | 22.61 | 920≧ | 442 | 493 | 525 | 382 | 3.981 | 123.0 |
| 6 | 1.84594 | 23.2 | 910≧ | 445 | 500 | 497 | 378 | 3.835 | 125.0 |
| 7 | 1.84979 | 23.1 | 900≧ | 452 | 504 | 500 | 378 | 3.851 | 118.5 |
| 8 | 1.83979 | 23.3 | 900≧ | 456 | 508 | 508 | 376 | 3.783 | 121.0 |
| 9 | 1.83435 | 23.46 | 900≧ | 466 | 516 | 514 | 376 | 3.757 | 119.0 |
| 10 | 1.90015 | 21.51 | 900≧ | 461 | 510 | 563 | 388 | 4.194 | 124.0 |
| 11 | 1.89836 | 21.41 | 900≧ | 455 | 507 | 567 | 388 | 4.152 | 129.0 |
| 12 | 1.89648 | 21.48 | 900≧ | 454 | 505 | 564 | 390 | 4.208 | 127.0 |
| 13 | 1.84980 | 22.95 | 890≧ | 457 | 506 | 511 | 379 | 3.83 | 117.2 |
| 14 | 1.82732 | 23.92 | 880≧ | 450 | 503 | 499 | 376 | 3.727 | 119.0 |
| 15 | 1.82485 | 24.02 | 870≧ | 453 | 506 | 494 | 375 | 3.721 | 119.0 |
| 16 | 1.84976 | 22.96 | 890≧ | 455 | 507 | 512 | 379 | 3.803 | 112.0 |
| 17 | 1.85316 | 22.94 | 890≧ | 456 | 508 | 521 | 379 | 3.808 | 116.0 |

(*) R$_2$O: Combinded amount of Li$_2$O, Na$_2$O, and K$_2$O

TABLE 2

| Embodiment | | P$_2$O$_5$ | Bi$_2$O$_3$ | Li$_2$O | Na$_2$O | K$_2$O | R$_2$O(*) | ZnO | CaO | BaO | Nb$_2$O$_5$ |
|---|---|---|---|---|---|---|---|---|---|---|---|
| 18 | Molar % | 36.01 | 0.70 | 10.48 | 11.49 | 4.38 | 26.35 | 13.97 | 0.00 | 20.17 | 1.40 |
|    | wt % | 44.2 | 2.8 | 2.7 | 6.2 | 3.6 | 12.5 | 9.8 | 0.0 | 26.7 | 3.2 |
| 19 | Molar % | 33.48 | 0.72 | 14.36 | 12.57 | 4.50 | 31.43 | 10.77 | 0.00 | 20.73 | 2.87 |
|    | wt % | 41.2 | 2.9 | 3.7 | 6.8 | 3.7 | 14.2 | 7.6 | 0.0 | 27.5 | 6.6 |
| 20 | Molar % | 36.03 | 0.70 | 11.87 | 13.58 | 4.38 | 29.83 | 10.48 | 0.00 | 20.17 | 2.79 |
|    | wt % | 43.6 | 2.8 | 3.0 | 7.2 | 3.5 | 13.7 | 7.3 | 0.0 | 26.3 | 6.3 |
| 21 | Molar % | 33.48 | 0.72 | 14.36 | 12.57 | 4.5 | 31.43 | 10.77 | 0.00 | 20.73 | 2.87 |
|    | wt % | 41.2 | 2.9 | 3.7 | 6.8 | 3.7 | 14.2 | 7.6 | 0.0 | 27.5 | 6.6 |
| 22 | Molar % | 36.00 | 0.70 | 10.40 | 10.40 | 4.00 | 24.80 | 14.00 | 0.00 | 23.00 | 0.00 |
|    | wt % | 44.3 | 2.8 | 2.7 | 5.6 | 3.3 | 11.6 | 9.9 | 0.0 | 30.5 | 0.0 |
| 23 | Molar % | 36.00 | 0.70 | 15.00 | 5.80 | 4.00 | 24.80 | 14.00 | 0.00 | 23.00 | 0.00 |
|    | wt % | 44.9 | 2.9 | 3.9 | 3.2 | 3.3 | 10.4 | 10.0 | 0.0 | 30.9 | 0.0 |
| 24 | Molar % | 36.00 | 0.70 | 14.40 | 10.40 | 0.00 | 24.80 | 14.00 | 0.00 | 23.00 | 0.00 |
|    | wt % | 45.3 | 2.9 | 3.8 | 5.7 | 0.0 | 9.5 | 10.1 | 0.0 | 31.2 | 0.0 |

TABLE 2-continued

| | | | | | | | | | | | |
|---|---|---|---|---|---|---|---|---|---|---|---|
| 25 | Molar % | 36.00 | 0.70 | 12.40 | 10.40 | 4.00 | 26.80 | 12.00 | 0.00 | 23.00 | 0.00 |
| | wt % | 44.7 | 2.9 | 3.2 | 5.7 | 3.3 | 12.2 | 8.5 | 0.0 | 30.8 | 0.0 |
| 26 | Molar % | 36.00 | 0.35 | 10.40 | 10.40 | 4.00 | 24.80 | 14.00 | 0.00 | 22.65 | 0.35 |
| | wt % | 44.5 | 1.4 | 2.7 | 5.6 | 3.3 | 11.6 | 9.9 | 0.0 | 30.2 | 0.8 |
| 27 | Molar % | 36.00 | 0.70 | 10.40 | 10.40 | 4.00 | 24.80 | 12.00 | 2.00 | 23.00 | 0.00 |
| | wt % | 44.5 | 2.9 | 2.7 | 5.6 | 3.3 | 11.6 | 8.5 | 1.0 | 30.6 | 0.0 |
| 28 | Molar % | 34.50 | 1.20 | 13.80 | 13.00 | 4.50 | 31.30 | 9.50 | 0.00 | 20.00 | 3.50 |
| | wt % | 41.3 | 4.7 | 3.5 | 6.8 | 3.6 | 13.9 | 6.5 | 0.0 | 25.8 | 7.8 |
| 29 | Molar % | 38.71 | 1.46 | 16.64 | 9.53 | 3.63 | 29.8 | 11.58 | 0.00 | 18.45 | 0.00 |
| | wt % | 48.3 | 6.0 | 4.4 | 5.2 | 3.0 | 12.6 | 8.3 | 0.0 | 24.8 | 0.0 |

| Embodiment | | $WO_3$ | $Nb_2O_5 + WO_3$ | $SiO_2$ | $B_2O_3$ | $Gd_2O_3$ | $Y_2O_3$ | $TiO_2$ | $TiO_2/Bi_2O_3$ | $TiO_2/Nb_2O_5$ | Sum |
|---|---|---|---|---|---|---|---|---|---|---|---|
| 18 | Molar % | 0.00 | 1.40 | 0.00 | 1.40 | 0.00 | 0.00 | 0.00 | 0.00 | 0.00 | 100.00 |
| | wt % | 0.0 | 3.2 | 0.0 | 0.8 | 0.0 | 0.0 | 0.0 | 0.0 | 0.0 | 100.0 |
| 19 | Molar % | 0.00 | 2.87 | 0.00 | 0.00 | 0.00 | 0.00 | 0.00 | 0.00 | 0.00 | 100.00 |
| | wt % | 0.0 | 6.6 | 0.0 | 0.0 | 0.0 | 0.0 | 0.0 | 0.0 | 0.0 | 100.0 |
| 20 | Molar % | 0.00 | 2.79 | 0.00 | 0.00 | 0.00 | 0.00 | 0.00 | 0.00 | 0.00 | 100.00 |
| | wt % | 0.0 | 6.3 | 0.0 | 0.0 | 0.0 | 0.0 | 0.0 | 0.0 | 0.0 | 100.0 |
| 21 | Molar % | 0.00 | 2.87 | 0.00 | 0.00 | 0.00 | 0.00 | 0.00 | 0.00 | 0.00 | 100.00 |
| | wt % | 0.0 | 6.6 | 0.0 | 0.0 | 0.0 | 0.0 | 0.0 | 0.0 | 0.0 | 100.0 |
| 22 | Molar % | 0.00 | 0.00 | 0.00 | 1.50 | 0.00 | 0.00 | 0.00 | 0.00 | 0.00 | 100.00 |
| | wt % | 0.0 | 0.0 | 0.0 | 0.9 | 0.0 | 0.0 | 0.0 | 0.0 | 0.0 | 100.0 |
| 23 | Molar % | 0.00 | 0.00 | 0.00 | 1.50 | 0.00 | 0.00 | 0.00 | 0.00 | 0.00 | 100.00 |
| | wt % | 0.0 | 0.0 | 0.0 | 0.9 | 0.0 | 0.0 | 0.0 | 0.0 | 0.0 | 100.0 |
| 24 | Molar % | 0.00 | 0.00 | 0.00 | 1.50 | 0.00 | 0.00 | 0.00 | 0.00 | 0.00 | 100.00 |
| | wt % | 0.0 | 0.0 | 0.0 | 1.0 | 0.0 | 0.0 | 0.0 | 0.0 | 0.0 | 100.0 |
| 25 | Molar % | 0.00 | 0.00 | 0.00 | 1.50 | 0.00 | 0.00 | 0.00 | 0.00 | 0.00 | 100.00 |
| | wt % | 0.0 | 0.0 | 0.0 | 0.9 | 0.0 | 0.0 | 0.0 | 0.0 | 0.0 | 100.0 |
| 26 | Molar % | 0.35 | 0.70 | 0.00 | 1.50 | 0.00 | 0.00 | 0.00 | 0.00 | 0.00 | 100.00 |
| | wt % | 0.7 | 1.5 | 0.0 | 0.9 | 0.0 | 0.0 | 0.0 | 0.0 | 0.0 | 100.0 |
| 27 | Molar % | 0.00 | 0.00 | 0.00 | 1.50 | 0.00 | 0.00 | 0.00 | 0.00 | 0.00 | 100.00 |
| | wt % | 0.0 | 0.0 | 0.0 | 0.9 | 0.0 | 0.0 | 0.0 | 0.0 | 0.0 | 100.0 |
| 28 | Molar % | 0.00 | 3.50 | 0.00 | 0.00 | 0.00 | 0.00 | 0.00 | 0.00 | 0.00 | 100.00 |
| | wt % | 0.0 | 7.8 | 0.0 | 0.0 | 0.0 | 0.0 | 0.0 | 0.0 | 0.0 | 100.0 |
| 29 | Molar % | 0.00 | 0.00 | 0.00 | 0.00 | 0.00 | 0.00 | 0.00 | 0.00 | 0.00 | 100.00 |
| | wt % | 0.0 | 0.0 | 0.0 | 0.0 | 0.0 | 0.0 | 0.0 | 0.0 | 0.0 | 100.0 |

| Embodiment | nd | vd | LT(° C.) | Tg(° C.) | Ts(° C.) | Specific Gravity | Haze value (%) | Dw (wt %) | $\alpha$ ($\times 10^{-7}$/° C.) |
|---|---|---|---|---|---|---|---|---|---|
| 18 | 1.59059 | 55.5 | 770 | 331 | 359 | 3.395 | 4.6 | 0.023 | 182.1 |
| 19 | 1.60551 | 50.79 | 750 | 332 | 371 | 3.435 | 0.3 | 0.03 | 184.0 |
| 20 | 1.59768 | 51.92 | 700 | 329 | 364 | 3.385 | 2.7 | 0.03 | 182.0 |
| 21 | 1.60551 | 50.79 | 700 | 332 | 371 | 3.435 | 0.3 | 0.03 | 184.0 |
| 22 | 1.58397 | 59.28 | 750 | 330 | 367 | 3.445 | 5.2 | 0.029 | 179.0 |
| 23 | 1.58899 | 59.37 | 750 | 335 | 370 | 3.443 | 9.5 | 0.033 | 167.0 |
| 24 | 1.59167 | 59.34 | 770 | 334 | 365 | 3.478 | 2.9 | 0.03 | 166.7 |
| 25 | 1.5819 | 59.43 | 750 | 322 | 359 | 3.414 | 8.1 | 0.036 | 169.0 |
| 26 | 1.58373 | 59.44 | 750 | 331 | 367 | 3.418 | 5.9 | 0.023 | 173.0 |
| 27 | 1.58366 | 59.67 | 750 | 328 | 371 | 3.431 | 3.3 | 0.035 | 181.0 |
| 28 | 1.61292 | 48.56 | 700 | 331 | 375 | 3.448 | 0.3 | 0.027 | 164.0 |
| 29 | 1.55796 | 63.54 | 750 | 293 | 331 | 3.14 | 1.2 | 0.011 | 175.0 |

(*)$R_2O$: Combined amount of $Li_2O$, $Na_2O$, and $K_2O$

To confirm the effect of introducing $Bi_2O_3$, glass melts were prepared having the glass composition of Embodiment 25 and the same composition without $Bi_2O_3$. FIG. 1 shows these glasses after they had been cast into preheated metal molds, cooled to the glass transition temperature, immediately annealed, and gradually cooled to room temperature. A transparent glass was obtained from the glass composition of Embodiment 25, but the composition without $Bi_2O_3$ crystallized, completely losing transparency.

The above-described glass melts were made to flow continuously at a constant flow rate from a flow nozzle made of platinum alloy. A glass melt gob of prescribed weight was separated from the glass melt flow by the drop-cut method, molded into a sphere while being supported by wind pressure with nitrogen gas on a forming mold, and annealed to manufacture a spherical preform.

Next, the glass melt was continuously dripped from a flow nozzle made of platinum alloy and the glass drops were molded into spheres while being supported by wind pressure with nitrogen gas on a forming mold and annealed to manufacture spherical preforms.

In this manner, spherical preforms ranging from 2 to 30 mm in diameter were molded. Spherical shapes are not the only shapes into which preforms can be molded: various shapes having a single rotational axis of symmetry can be molded. The weight precision of the preforms obtained was kept to within 1 percent. In the above preforms, the entire surface of the preform was formed by solidification of glass in a molten state, and the entire surface was a free surface.

No bubbles, striae, devitrification, or damaged spots were found in any of the preforms; they had smooth, unscratched surfaces.

Figure 2:
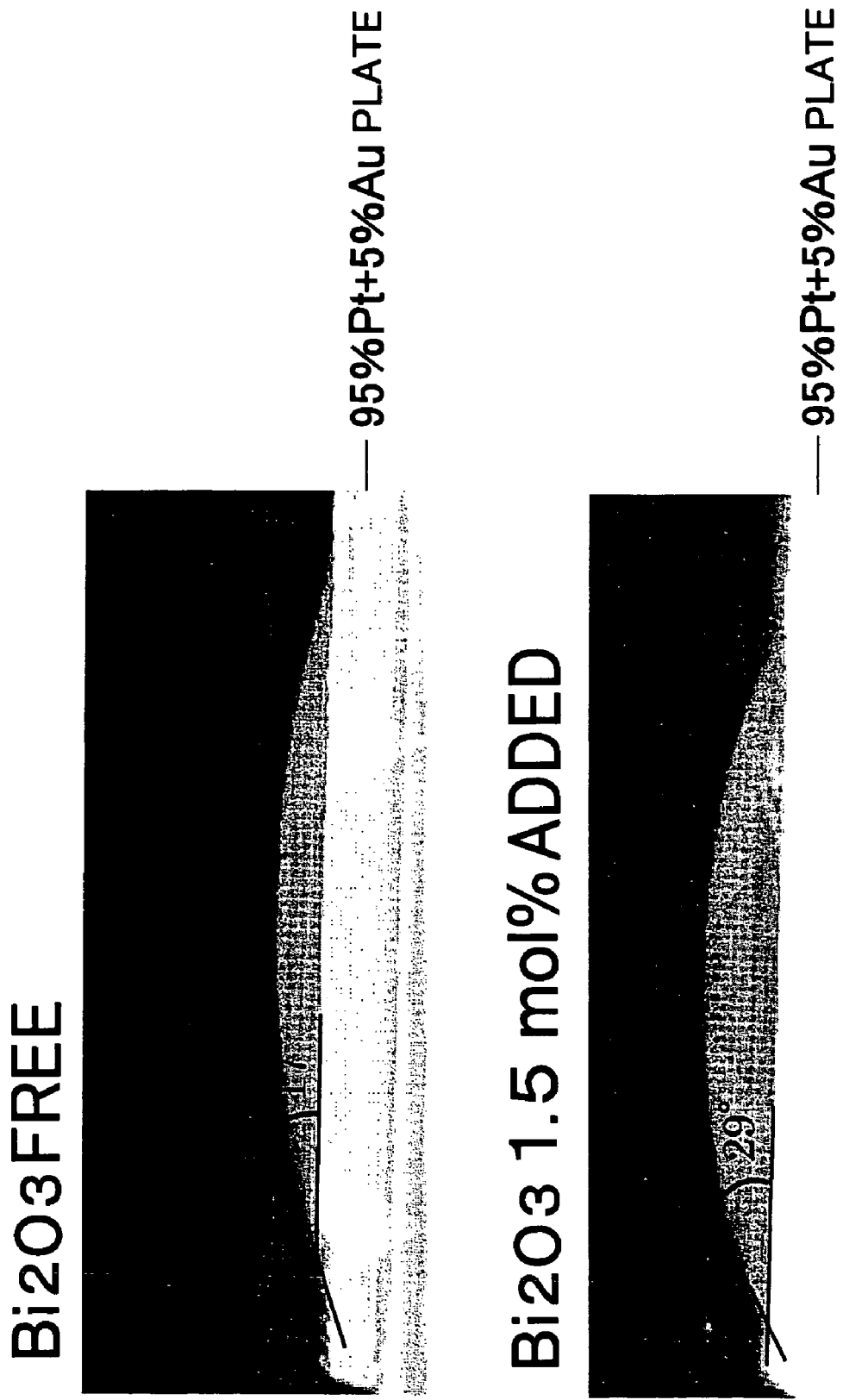
FIG. 2 shows the results of wetting angle tests conducted for the glass of Embodiment 29 and a glass obtained by removing $Bi_2O_3$ from the composition thereof.

To evaluate the degree of wetting of the outer circumference of the tip of the platinum or platinum alloy flow nozzle, a flat sheet of platinum alloy comprised of 95 atomic percent Pt and 5 atomic percent Au was prepared and employed in wetting angle evaluation. The planar dimensions of the platinum alloy plate were 10×10 mm. The surface was mirror polished. The Rz of the surface was 50 to 1,000 nm. Glass of the composition of Embodiment 45 and glass of the same composition without $Bi_2O_3$ were formed into cubes 4 $mm^3$, positioned in the center of plates positioned horizontally, heated to a temperature 20° C. higher than the liquid-phase temperature, and maintained for 30 min. The glass samples were remelted in this manner a second time, annealed, maintained for 1 hour at a temperature below the glass transition temperature, and then cooled at a rate of −30° C./hour to room temperature. As shown in FIG. 2, the wetting angles of the glass of Embodiment 29 and the glass of that composition without the $Bi_2O_3$ were measured.

In Embodiment 29, the wetting angle was 29°, while in the composition without $Bi_2O_3$, the wetting angle was 17°. Although the wetting angle of glass containing $P_2O_5$ was low, the incorporation of $Bi_2O_3$ increased the wetting angle for platinum alloys. Thus, it was possible to reduce wetting by the glass melt of the outer circumference of the tip of the flow pipe in the course of causing glass melt to flow out of a flow pipe made of platinum or a platinum alloy, and prevent the generation of striae in the preform and a decrease in weight precision.

Embodiment 30

Figure 3:
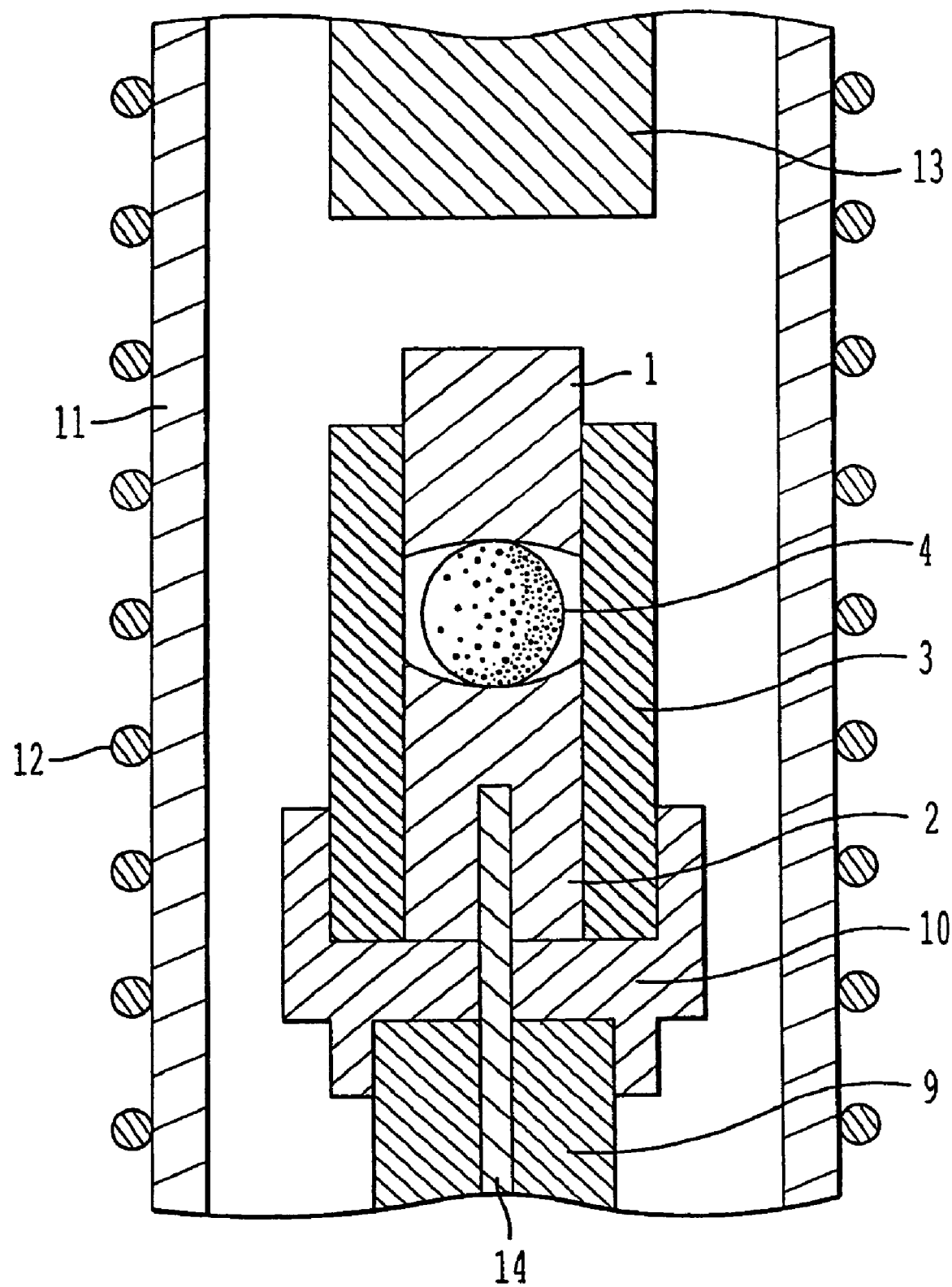
FIG. 3 is a schematic drawing descriptive of a precision press-molding device.

Aspherical lenses were obtained by precision press molding the preforms for precision press molding obtained in Embodiments 1 to 29 in the precision pressing mold shown in FIG. 3.

The precision press molding was conducted in the following manner. First, a preform from the above embodiments was placed between a lower mold 2 and an upper mold 1. The interior of a quartz tube 11 was filled with a nitrogen atmosphere and a heater 12 was operated to heat the interior of quartz tube 11. The temperature within the pressing mold was set 20 to 60° C. higher than the sag point of the glass. Maintaining this temperature, a pressing rod 13 was lowered, pressing against upper mold 1 and pressing the preform within the pressing mold. The pressing mold employed here was made of SiC with a carbon mold separation film formed on the molding surface to which the glass sometimes adheres. The pressing pressure was 8 MPa applied for 30 seconds. The pressure was then released, the precision press-molded glass was gradually cooled to a temperature 30° C. lower than the glass transition temperature while still in contact with lower mold 2 and upper mold 1, the glass was rapidly cooled to room temperature and removed from the pressing mold, and an aspherical lens was removed. The aspherical lens obtained was of extremely high precision.

A preform that had been preheated to a temperature 20 to 60° C. higher than the sag point of the glass constituting the preform was introduced into a pressing mold that had been preheated to a temperature lower than that to which the preform had been preheated and precision press molded to obtain an aspherical lens.

The use of the preform of any of Embodiments 1 to 29 comprised of glass with a low glass transition temperature permitted the use of a stainless steel pressing mold with a mold separation film in the form of a nickel film provided on the molding surface as needed.

In the above-described embodiments, a description is given for the example of aspherical lenses. However, various optical elements such as spherical lenses, microlenses, lens arrays, lenses with diffraction gratings, various other lenses, diffraction gratings, prisms, prisms with lenses, and polygonal mirrors can be manufactured without mechanical processing optically functional surfaces.

The present disclosure relates to the subject matter contained in Japanese Patent Application No. 2003-188455 filed on Jun. 30, 2003 and Japanese Patent Application No. 2003-306126 filed on Aug. 29, 2003, which is expressly incorporated herein by reference in its entirety.

What is claimed is:

1. A precision press molding preform, characterized by being comprised of an optical glass the components of which are:

| | |
|---|---|
| $P_2O_5$: | 15 to 70 molar percent, |
| $Nb_2O_5$: | 1 to 30 molar percent |
| $TiO_2$: | 0 to 9.984 molar percent (excluding 0 molar percent), |
| $Bi_2O_3$: | 6 to 30 molar percent (excluding 6 molar percent) |
| $B_2O_3$: | 0 to 30 molar percent, |
| $WO_3$: | equal to or more than 2 molar percent, |
| BaO: | equal to or less than 10 molar percent, |
| $Li_2O$: | 2 to 30 molar percent, |
| $SiO_2$: | 0 to 2 molar percent, |
| ZnO: | 0 to 12 molar percent, | which has a refractive index (nd) more than 1.80, a liquid-phase temperature equal to or lower than 910° C. and an Abbé number (vd) of less than or equal to 32, and where the molar ratio of ($TiO_2$ content/$Bi_2O_3$ content) is less than 2.917 and the molar ratio $TiO_2$/$Nb_2O_5$ is <0.3328.

2. A precision press molding preform, as recited in claim 1, wherein the molar ratio $Li_2O/(Li_2O+Na_2O+K_2O) \geq 0.4$).

3. A precision press molding preform, characterized by being comprised of an optical glass the components of which are:

| | |
|---|---|
| $P_2O_5$: | 15 to 70 molar percent, |
| $Nb_2O_5$: | 1 to 30 molar percent |
| $TiO_2$: | 0 to 9.984 molar percent (excluding 0 molar percent), |
| $Bi_2O_3$: | 6 to 30 molar percent (excluding 6 molar percent) |
| $B_2O_3$: | 0 to 30 molar percent, |
| $WO_3$: | equal to or more than 2 molar percent, |
| BaO: | equal to or less than 10 molar percent, |
| $Li_2O$: | 2 to 30 molar percent, |
| $SiO_2$: | 0 to 2 molar percent, |
| ZnO: | 0 to 12 molar percent, | which has a refractive index (nd) more than 1.80, a liquid-phase temperature equal to or lower than 910° C. and an Abbé number (vd) of less than or equal to 32, and where the molar ratio of ($TiO_2$ content/$Bi_2O_3$ content) is less than 2.917 and the molar ratio $TiO_2$/$Nb_2O_5$ is <0.3328.

4. A precision press molding preform, as recited in claim 3, wherein the molar ratio $Li_2O/(Li_2O+Na_2O+K_2O) \geq 0.4$).

5. A precision press molding preform, characterized by being comprised of an optical glass the components of which are:

| | |
|---|---|
| $P_2O_5$: | 15 to 70 molar percent, |
| $Nb_2O_5$: | 1 to 30 molar percent |
| $TiO_2$: | 0 to 9.984 molar percent (excluding 0 molar percent), |
| $Bi_2O_3$: | 6 to 30 molar percent (excluding 6 molar percent) |
| $B_2O_3$: | 0 to 30 molar percent, |
| $WO_3$: | equal to or more than 2 molar percent, |
| BaO: | equal to or less than 10 molar percent, |
| $Li_2O$: | 2 to 30 molar percent, |
| $SiO_2$: | 0 to 2 molar percent, | where the Li$_2$O, Na$_2$O, and K$_2$O content is less than 42 molar percent, which has a refractive index (nd) more than 1.80, a liquid-phase temperature equal to or lower than 910° C. and an Abbé number (vd) of less than or equal to 32, and where the molar ratio of (TiO$_2$ content/Bi$_2$O$_3$ content) is less than 2.917 and the molar ratio TiO$_2$/Nb$_2$O$_5$ is <0.3328.

6. A precision press molding preform, as recited in claim 5, wherein the molar ratio Li$_2$O/(Li$_2$O+Na$_2$O+K$_2$O)≧0.4).

7. A precision press molding preform, characterized by being comprised of an optical glass the components of which are:

| | |
|---|---|
| P$_2$O$_5$: | 15 to 70 molar percent, |
| Nb$_2$O$_5$: | 1 to 30 molar percent |
| TiO$_2$: | 0 to 9.984 molar percent (excluding 0 molar percent), |
| Bi$_2$O$_3$: | 6 to 30 molar percent (excluding 6 molar percent) |
| B$_2$O$_3$: | 0 to 30 molar percent (excluding 0 molar percent), |
| WO$_3$: | equal to or more than 2 molar percent, |
| BaO: | equal to or less than 10 molar percent, |
| Li$_2$O: | 2 to 30 molar percent, |
| SiO$_2$: | 0 to 2 molar percent, | where the Li$_2$O, Na$_2$O, and K$_2$O content is less than 42 molar percent, which has a refractive index (nd) more than 1.80, a liquid-phase temperature equal to or lower than 910° C. and an Abbé number (vd) of less than or equal to 32, and where the molar ratio of (TiO$_2$ content/Bi$_2$O$_3$ content) is less than 2.917 and the molar ratio TiO$_2$/Nb$_2$O$_5$ is <0.3328.

8. A precision press molding preform, as recited in claim 7, wherein the molar ratio Li$_2$O/(Li$_2$O+Na$_2$O+K$_2$O)≧0.4).

9. A precision press molding preform, characterized by being comprised of an optical glass the components of which are:

| | |
|---|---|
| P$_2$O$_5$: | 15 to 70 molar percent, |
| Nb$_2$O$_5$: | 1 to 30 molar percent |
| TiO$_2$: | 0 to 9.984 molar percent (excluding 0 molar percent), |
| Bi$_2$O$_3$: | 0 to 30 molar percent (excluding 6 molar percent) |
| B$_2$O$_3$: | 0 to 30 molar percent, |
| WO$_3$: | equal to or more than 2 molar percent, |
| BaO: | equal to or less than 10 molar percent, |
| Li$_2$O: | 2 to 30 molar percent, |
| SiO$_2$: | 0 to 2 molar percent, |
| ZnO: | 0 to 12 molar percent, | where the molar ratio of (TiO$_2$ content/Bi$_2$O$_3$ content) is less than 2.917, which has a refractive index (nd) more than 1.80, a liquid-phase temperature equal to or lower than 910° C. and an Abbé number (vd) of less than or equal to 32, the molar ratio Li$_2$O/(Li$_2$O+Na$_2$O+K$_2$O)≧0.4), and the molar ratio TiO$_2$/Nb$_2$O$_5$ is <0.3328.

10. A precision press molding preform, characterized by being comprised of an optical glass the components of which are:

| | |
|---|---|
| P$_2$O$_5$: | 15 to 70 molar percent, |
| Nb$_2$O$_5$: | 1 to 30 molar percent |
| TiO$_2$: | 0 to 9.984 molar percent (excluding 0 molar percent), |
| Bi$_2$O$_3$: | 0 to 30 molar percent (excluding 0 molar percent), |
| B$_2$O$_3$: | 0 to 30 molar percent (excluding 0 molar percent), |
| WO$_3$: | equal to or more than 2 molar percent, |
| BaO: | equal to or less than 10 molar percent, |
| Li$_2$O: | 2 to 30 molar percent, |
| SiO$_2$: | 0 to 2 molar percent, |
| ZnO: | 0 to 12 molar percent, | where the molar ratio of (TiO$_2$ content/Bi$_2$O$_3$ content) is less than 2.917, which has a refractive index (nd) more than 1.80, a liquid-phase temperature equal to or lower than 910° C. and an Abbé number (vd) of less than or equal to 32, the molar ratio Li$_2$O/(Li$_2$O+Na$_2$O+K$_2$O)≧0.4) and the molar ratio TiO2/Nb2O$_5$ is <0.3328.

11. A precision press molding preform, characterized by being comprised of an optical glass the components of which are:

| | |
|---|---|
| P$_2$O$_5$: | 15 to 70 molar percent, |
| Nb$_2$O$_5$: | 1 to 30 molar percent |
| TiO$_2$: | 0 to 9.984 molar percent (excluding 0 molar percent), |
| Bi$_2$O$_3$: | 0 to 30 molar percent (excluding 0 molar percent), |
| B$_2$O$_3$: | 0 to 30 molar percent (excluding 0 molar percent), |
| WO$_3$: | equal to or more than 2 molar percent, |
| BaO: | equal to or less than 10 molar percent, |
| Li$_2$O: | 2 to 30 molar percent, |
| SiO$_2$: | 0 to 2 molar percent, |
| ZnO: | 0 to 12 molar percent, | where the Li$_2$O, Na$_2$O, and K$_2$O content is less than 42 molar percent and the molar ratio of (TiO$_2$ content/Bi$_2$O$_3$ content) is less than 2.917, which has a refractive index (nd) more than 1.80, a liquid-phase temperature equal to or lower than 910° C. and an Abbé number (vd) of less than or equal to 32, the molar ratio Li$_2$O/(Li$_2$O+Na$_2$O+K$_2$O)≧0.4)), and the molar ratio TiO$_2$/Nb2O$_5$ is <0.3328.

12. A precision press molding preform, characterized by being comprised of an optical glass the components of which are:

| | |
|---|---|
| P$_2$O$_5$: | 15 to 70 molar percent, |
| Nb$_2$O$_5$: | 1 to 30 molar percent |
| TiO$_2$: | 0 to 9.984 molar percent (excluding 0 molar percent), |
| Bi$_2$O$_3$: | 0 to 30 molar percent (excluding 0 molar percent), |
| B$_2$O$_3$: | 0 to 30 molar percent (excluding 0 molar percent), |
| WO$_3$: | equal to or more than 2 molar percent, |
| BaO: | equal to or less than 10 molar percent, |
| Li$_2$O: | 2 to 30 molar percent, |
| SiO$_2$: | 0 to 2 molar percent, | where the Li$_2$O, Na$_2$O, and K$_2$O content is less than 42 molar percent and the molar ratio of (TiO$_2$ content/Bi$_2$O$_3$ content) is less than 2.917, which has a refractive index (nd) more than 1.80, a liquid-phase temperature equal to or lower than 910° C. and an Abbé number (vd) of less than or equal to 32, the molar ratio Li$_2$O/(Li$_2$O+Na$_2$O+K$_2$O)≧0.4)), and the molar ratio TiO$_2$/Nb2O$_5$ is <0.3328.

13. An optical element obtained by precision press molding a preform, wherein the preform is a preform made according to any one of claims 1, 3, 5, 7, 9, 10, 11 and 12.

14. A method of manufacturing a preform for precision press molding, characterized in that a glass melt gob of prescribed weight is separated from a glass melt flowing out of a flow pipe and up to solidification of the glass melt gob, a preform according to any one of claims 1, 3, 5, 7, 9, 10, 11 and 12 with a weight equal to the above prescribed weight is formed.

15. A method of manufacturing an optical element characterized in that in a method of manufacturing an optical element by heating a glass preform and conducting precision press molding, the preform according to any one of claims 1, 3, 5, 7, 9, 10, 11 and 12.

16. The method of manufacturing an optical element according to 15 wherein the preform and pressing mold are both heated and precision press molding is conducted.

17. The method of manufacturing an optical element according to claim 15, wherein a heated preform is introduced into a pressing mold that has been preheated separately from said preform and precision press molding is conducted.

18. A method of manufacturing a perform by the manufacturing method according to claim 14 wherein the perform is heated and precision molded with a pressing mold.

* * * * *